US012755642B2

(12) United States Patent
Maruyama

(10) Patent No.: US 12,755,642 B2
(45) Date of Patent: Oct. 6, 2026

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Naoki Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/670,953

(22) Filed: May 22, 2024

(65) Prior Publication Data

US 2024/0404417 A1 Dec. 5, 2024

(30) Foreign Application Priority Data

May 31, 2023 (JP) ................................ 2023-090206

(51) Int. Cl.
*G09B 3/02* (2006.01)
*H04N 1/00* (2006.01)

(52) U.S. Cl.
CPC .......... *G09B 3/02* (2013.01); *H04N 1/00328* (2013.01); *H04N 1/00408* (2013.01); *H04N 2201/0094* (2013.01)

(58) Field of Classification Search
CPC ........ G09B 3/02; G09B 3/00; H04N 1/00328; H04N 1/00408; H04N 2201/0094
See application file for complete search history.

(56) References Cited

U.S. PATENT DOCUMENTS

2004/0184051 A1* 9/2004 Bailey .................. H04N 1/6033 358/1.9
2006/0046239 A1* 3/2006 Allen ....................... G09B 7/00 434/353
2016/0148522 A1* 5/2016 Rowland ............ H04L 65/4015 434/362
2018/0277005 A1* 9/2018 Taylor .............. G06K 19/06028

FOREIGN PATENT DOCUMENTS

JP 2008-158727 A 7/2008

* cited by examiner

*Primary Examiner* — Timothy A Musselman
(74) *Attorney, Agent, or Firm* — Venable LLP

(57) ABSTRACT

An image processing apparatus acquires region information on one or more regions on a printed material which are to be filled in is acquired, the region information being obtained by analyzing print data of the printed material. An image processing apparatus superimposes an object indicating a region corresponding to the region information on a read image obtained by reading a printed material on which one or more regions have already been filled in, and displays the result on a display unit. Further, the image processing apparatus sets a confirmation result for each of the one or more regions in accordance with user input that was inputted via the display unit.

16 Claims, 27 Drawing Sheets

FIG. 7A

700

```
{
 DOCUMENT PATH: "",
 TITLE: "",
 THUMBNAIL IMAGE PATH:"",
 CREATION DATE AND TIME: "",
 UPDATE DATE AND TIME:"",
 SCORE ALLOCATION INFORMATION:[
   "○":0,
   "×":0,
   "△":0,
 ],
 SCORING INFORMATION: [
  {
   STUDENT DOCUMENT PATH ""
   STUDENT INFORMATION: {
     YEAR: 0,
     YEAR:0,
     NUMBER:0,
     NAME:""
   },
   FRAME INFORMATION: [ ],
   COMMENT INFORMATION: [ ]
  }
 ],
}
```

SCORING DATA STRUCTURAL EXAMPLE

FIG. 7B

701

```
{
DOCUMENT PATH: "X:/TestA/TestImage",
TITLE: "TestA",
THUMBNAIL IMAGE PATH: "X:TSTA/Thumbnail",
CREATION DATE AND TIME: "YYYY/MM/DD hh:mm:ss",
UPDATE DATE AND TIME: "YYYY/MM/DD hh:mm:ss",
SCORE ALLOCATION INFORMATION: [
  "○":2,
  "×":0,
  "△":1,
 ],
 SCORING INFORMATION :[
  {
   STUDENT DOCUMENT PATH "X:/TestA/TestImages/xxxx.Jpg"
   STUDENT INFORMATION:{
      YEAR: 2,
      YEAR: 1,
      NUMBER:13,
      NAME:"TARO NIPPON"
   }
    FRAME INFORMATION:[
     {
      POSITION:{ X:0, Y:0 },
      SIZE:{ width:10, height:20 },
      ATTRIBUTE INFORMATION:"ANSWER"
      SCORING RESULT:"○"
      INDIVIDUAL SCORE:NULL,
      ATTRIBUTE DETAIL INFORMATION:{ },
     },
     ...
    },
    COMMENT INFORMATION:[
     {
      POSITION:{ X:0, Y:0 },
      COMMENT TEXT: "NEATER PLEASE!",
     },
     ...
    ]
  },
  ...
 ],
}
```

SCORING DATA CONCRETE EXAMPLE

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Systems in which a sheet of a printed material that has been filled in is read by a scanner, and the content of what is filled in is analyzed by a device such as a PC using the read image are known. For example, there are scoring systems and the like that electronically score a test using a read image of a test sheet. In such an image-analysis based scoring system, it is necessary to recognize the positions and sizes of frames indicating outer edges of answer fields, subtotal and total score fields, and the like in a test image in order to fill in scores for questions and a total score. In many systems, it is common to acquire information on frame information and the like in a printed material by using image recognition or AI processing. For example, Japanese Patent Laid-Open No. 2008-158727 proposes registering a printing spool file and ruled line data in a management computer for a business form generated by analyzing print data.

However, the above-described conventional techniques have the challenges described below. With the above-described conventional techniques, for example, a system that performs electronic scoring using data managed by a management computer is conceivable. However, in order to manage the information on the contents of the printed material and analyze the print data as in the above conventional techniques, sufficient hardware resources are required to perform control, and it is necessary to provide a server or the like with a high processing capability separately from the printing apparatus. That is, an apparatus that performs such control requires sufficient hardware resources for CPU, memory, and the like. Therefore, in an image processing apparatus such as a printing apparatus having a lower CPU processing capacity or an image processing apparatus having a smaller storage area capacity, processing latency and exhaustion of memory resources are caused, and a function having sufficient performance cannot be provided to a user.

SUMMARY OF THE INVENTION

The present invention enables realization of a mechanism for suitably confirming what is filled into a printed material on which predetermined items are printed, even in a case of an image processing apparatus that does not have sufficient hardware resources.

One aspect of the present invention provides an image processing apparatus, comprising: one or more memory devices that store a set of instructions; and one or more processors that execute the set of instructions to: acquire region information on one or more regions on a printed material which are to be filled in, the region information being obtained by analyzing print data of the printed material; superimpose an object indicating a region corresponding to the region information on a read image obtained by reading the printed material after the one or more regions have been filled in, and display on a display unit a result of the superimposing; and set a confirmation result for each of the one or more regions in accordance with a user input that is inputted via the display unit.

Another aspect of the present invention provides an image processing apparatus, comprising: one or more memory devices that store a set of instructions; and one or more processors that execute the set of instructions to: acquire region information on one or more regions on a printed material which are to be filled in, the region information being obtained by analyzing print data of the printed material; output the printed material in accordance with the print data; read the printed material after the one or more regions have been filled in; superimpose an object indicating a region corresponding to the region information on the read image, and display a result of the superimposing on a display unit; and set a confirmation result for each of the one or more regions in accordance with a user input that is inputted via the display unit.

Still another aspect of the present invention provides a method for controlling an image processing apparatus, the method comprising: acquiring region information on one or more regions on a printed material which are to be filled in, the region information being obtained by analyzing print data of the printed material; superimposing an object indicating a region corresponding to the region information on a read image obtained by reading the printed material after the one or more regions have been filled in, and displaying on a display unit a result of the superimposing; and setting a confirmation result for each of the one or more regions in accordance with a user input that is inputted via the display unit.

Yet still another aspect of the present invention provides a non-transitory computer-readable storage medium storing a program for causing an image processing apparatus to: acquire region information on one or more regions on a printed material which are to be filled in, the region information being obtained by analyzing print data of the printed material; superimpose an object indicating a region corresponding to the region information on a read image obtained by reading the printed material after the one or more regions have been filled in, and display on a display unit a result of the superimposing; and set a confirmation result for each of the one or more regions in accordance with a user input that is inputted via the display unit.

Further features of the present invention will become apparent from the following description of exemplary embodiments (with reference to the attached drawings).

BRIEF DESCRIPTION OF THE DRAWINGS

FIGS. 7A-7B are a view illustrating a structural example of scoring data and a concrete example according to an embodiment.

DESCRIPTION OF THE EMBODIMENTS

Figure 1:
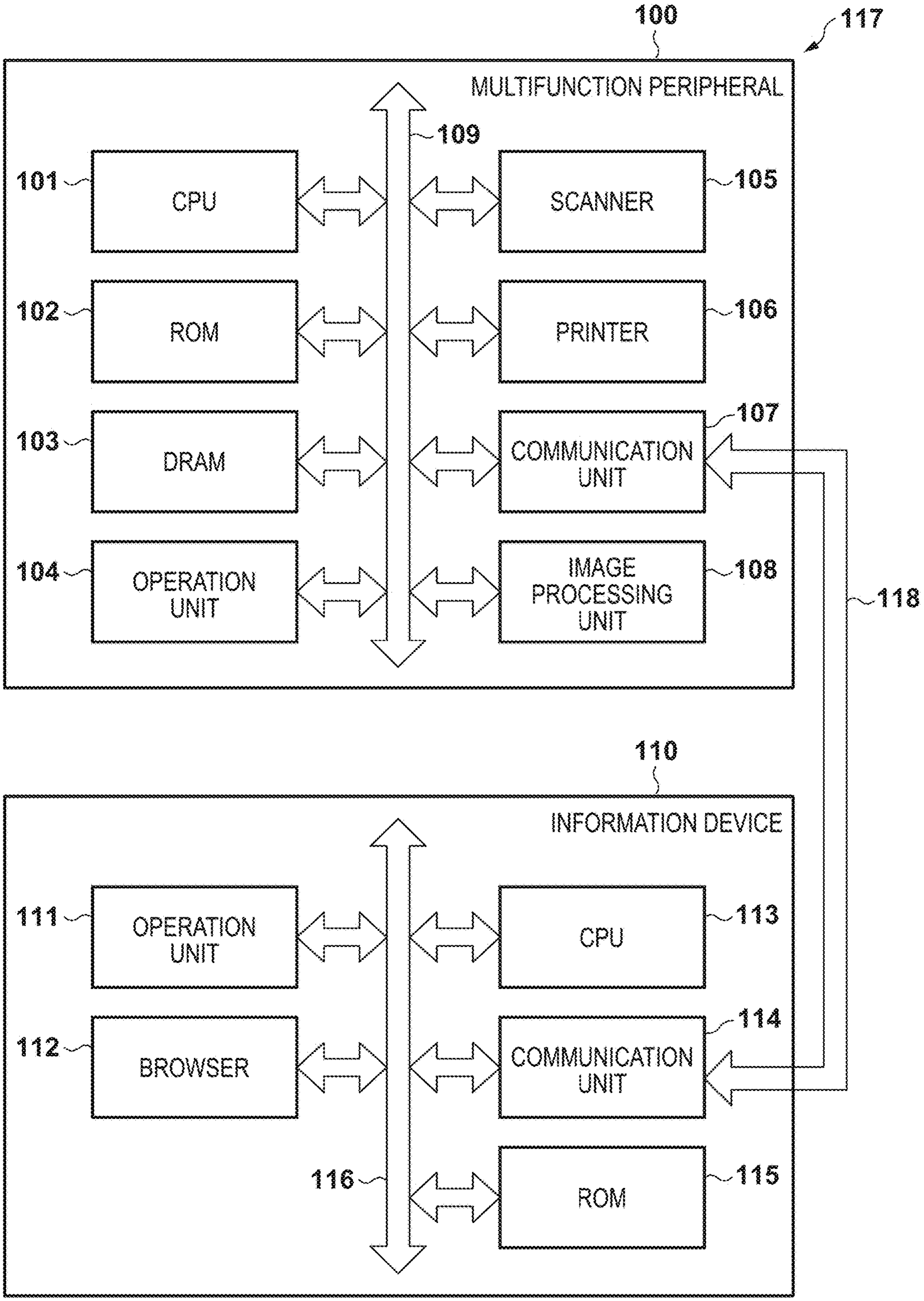
FIG. 1 is a diagram illustrating a configuration example of a system according to an embodiment.
Figure 2A:
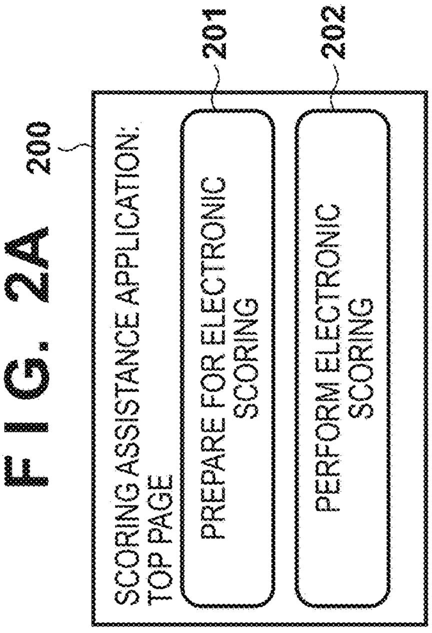
FIGS. 2A-2E are a diagram illustrating an exemplary RUI of a scoring assistance application according to an embodiment.
Figure 2B:
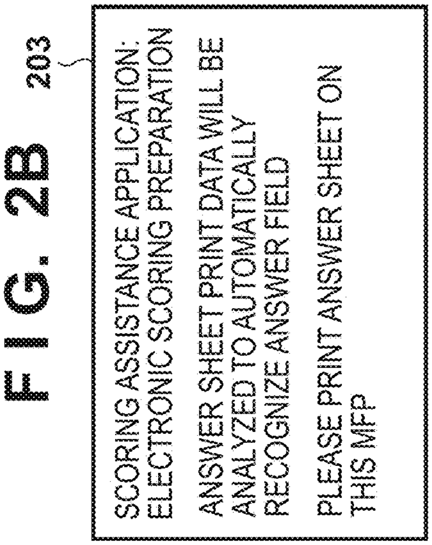
Figure 2C:
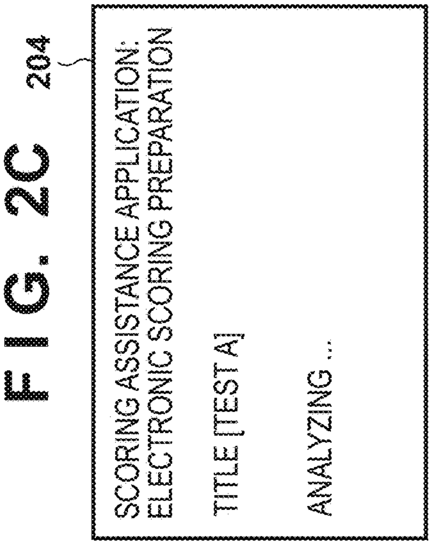
Figure 2D:
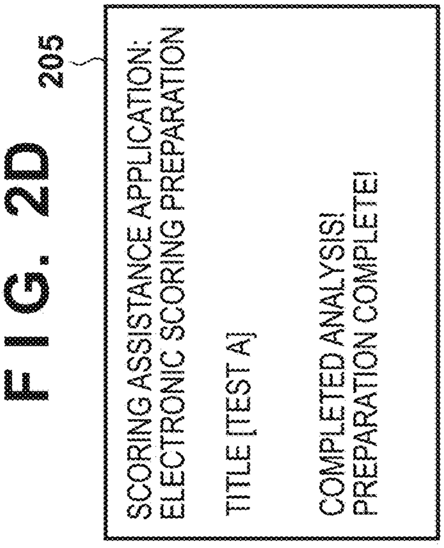
Figure 2E:
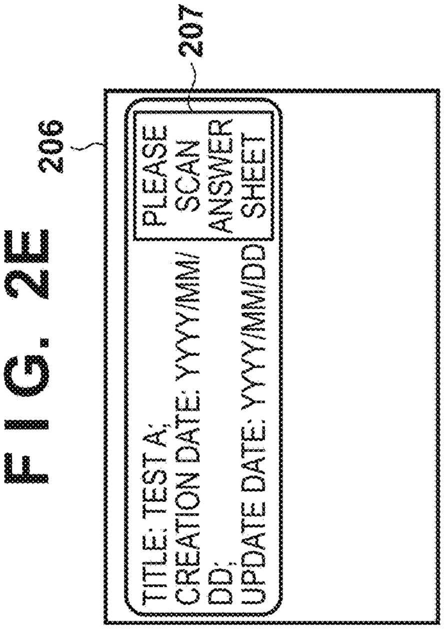
Figure 3A:
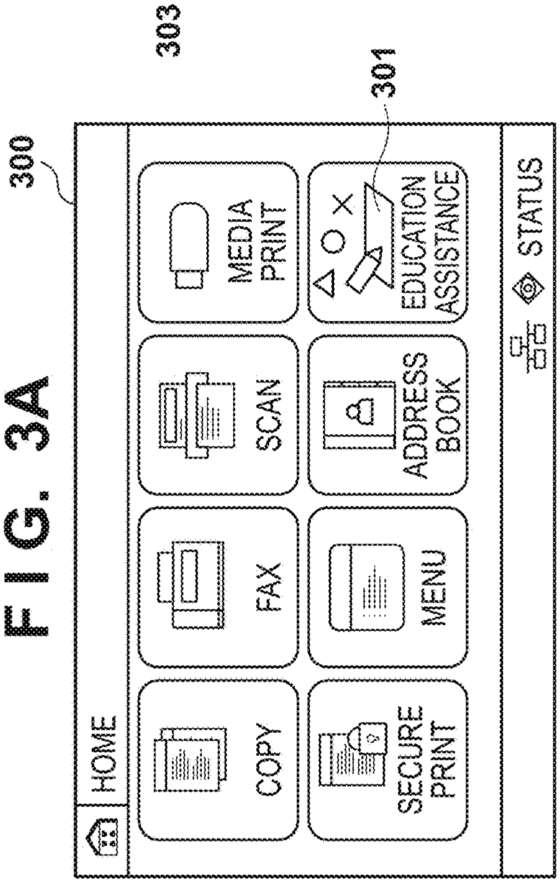
FIGS. 3A-3H are a diagram illustrating an example of a home screen, and an example of LUI and RUI pages of a scoring assistance application, according to an embodiment.
Figure 3B:
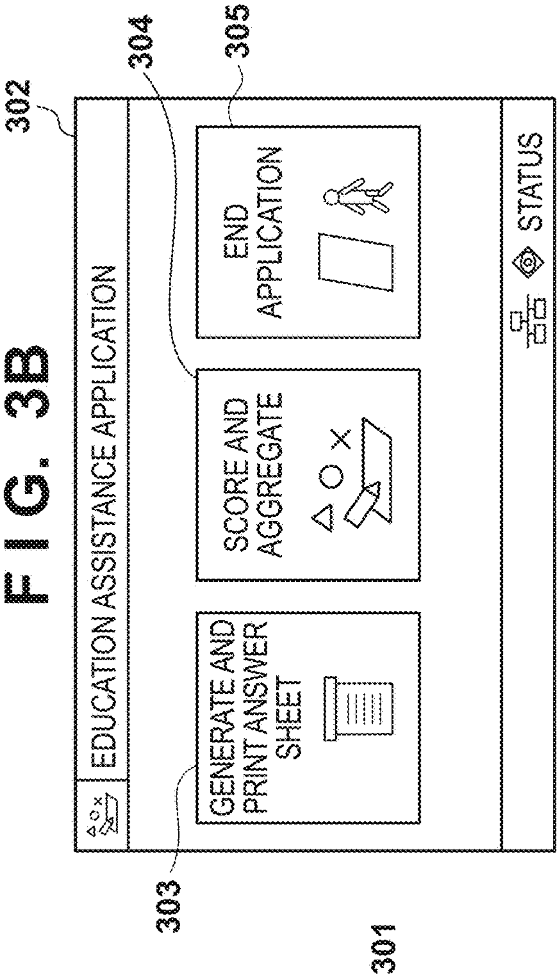
Figure 3C:
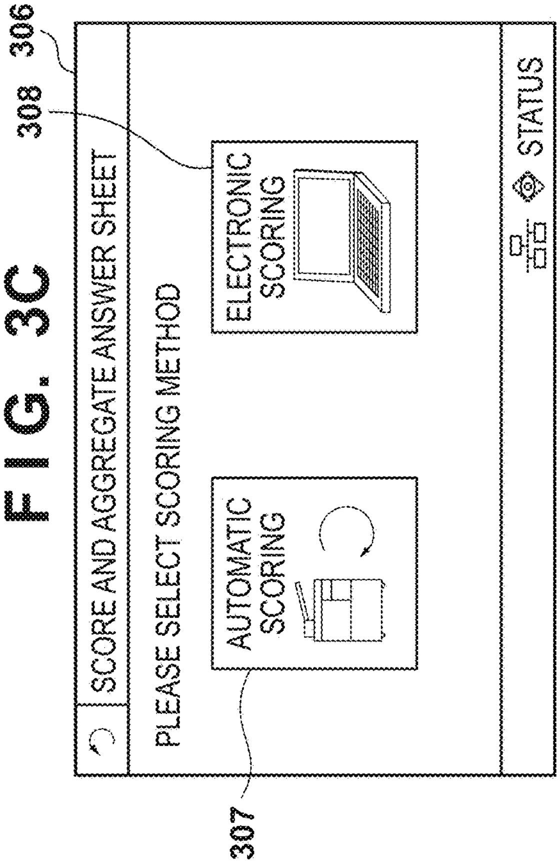
Figure 3D:
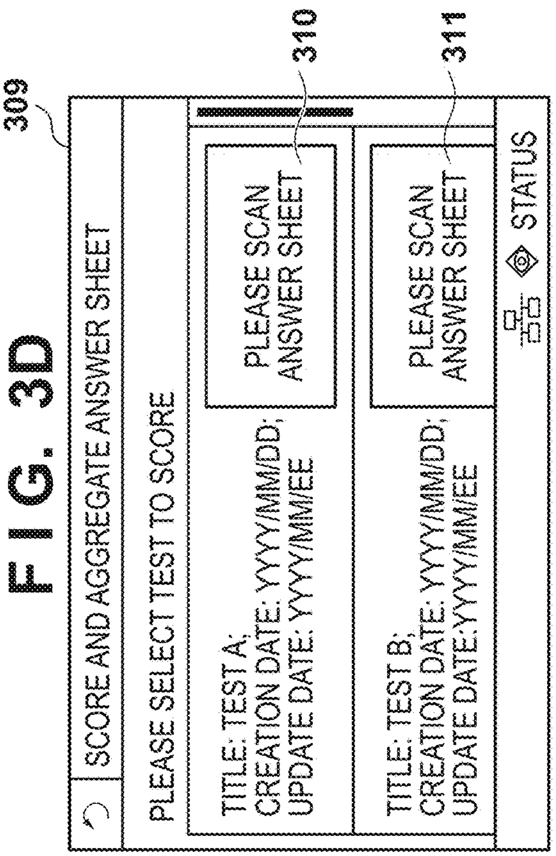
Figure 3E:
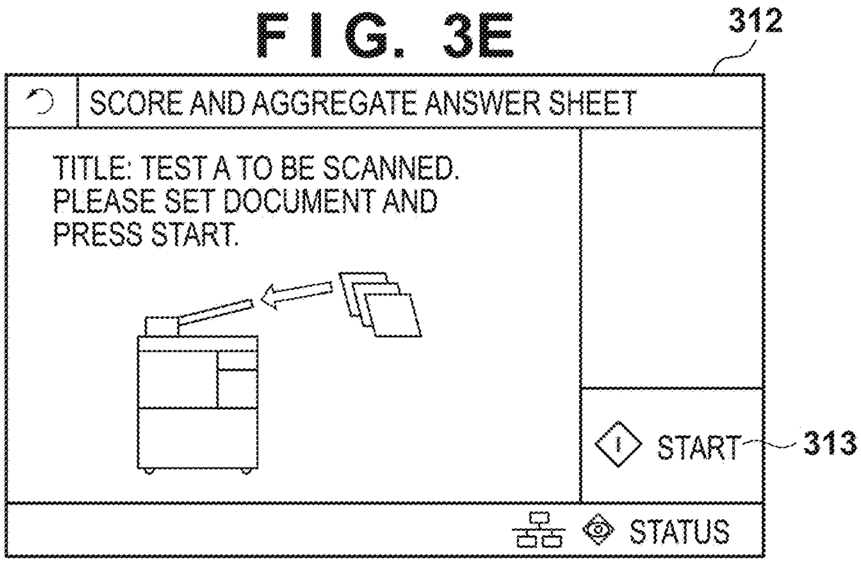
Figure 3F:
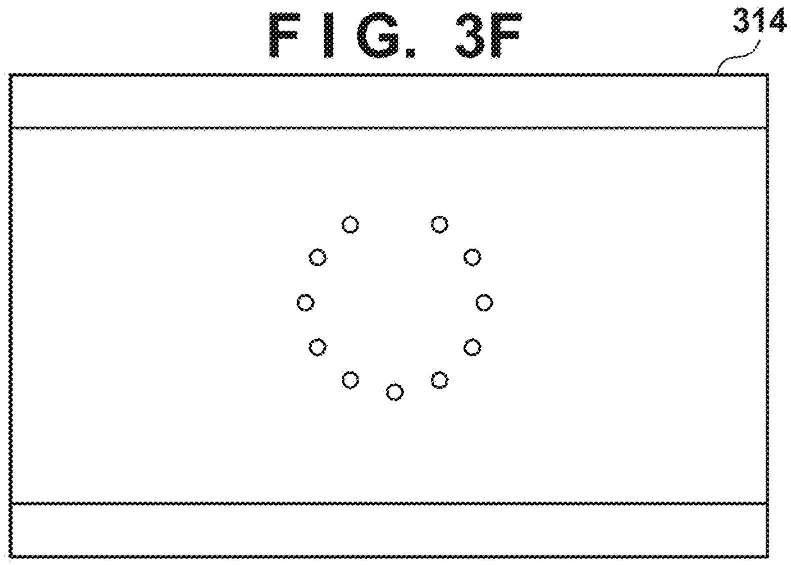
Figure 3G:
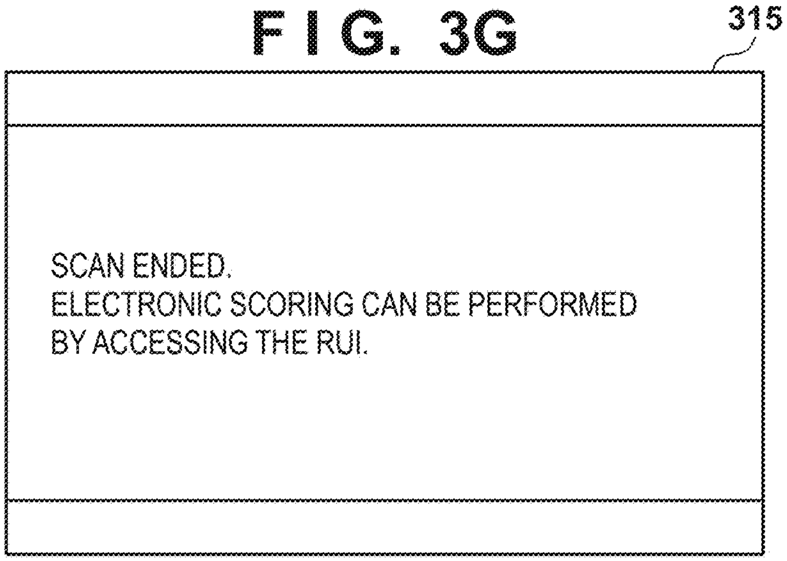
Figure 3H:
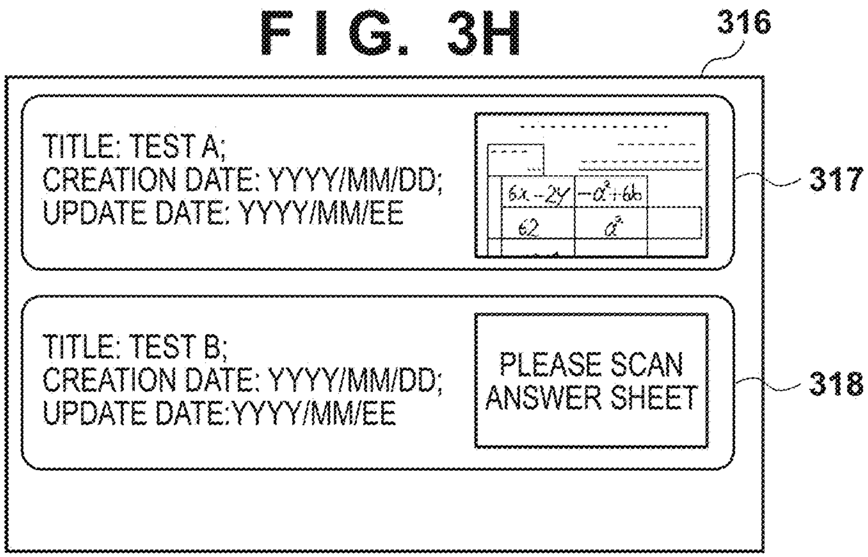
Figure 4A:
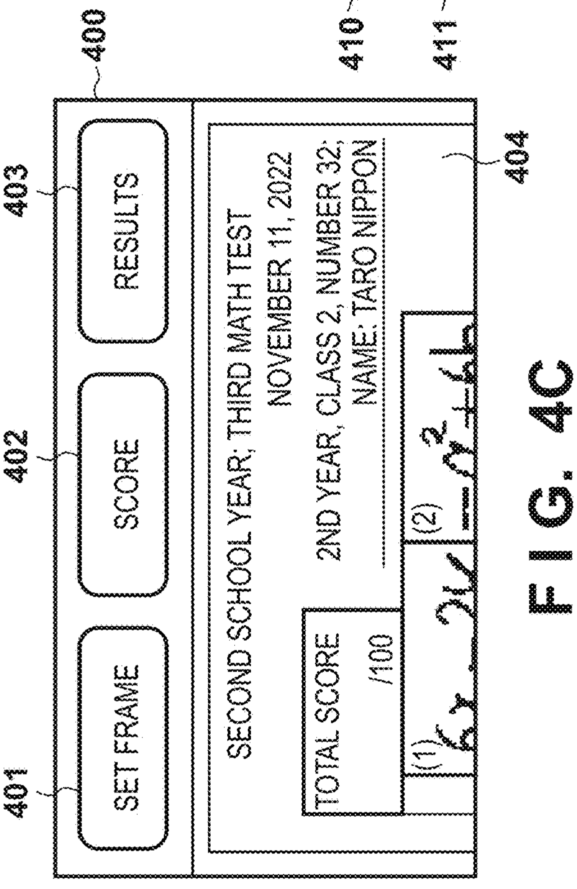
FIGS. 4A-4D are a diagram illustrating an exemplary RUI of a scoring assistance application according to an embodiment.
Figure 4B:
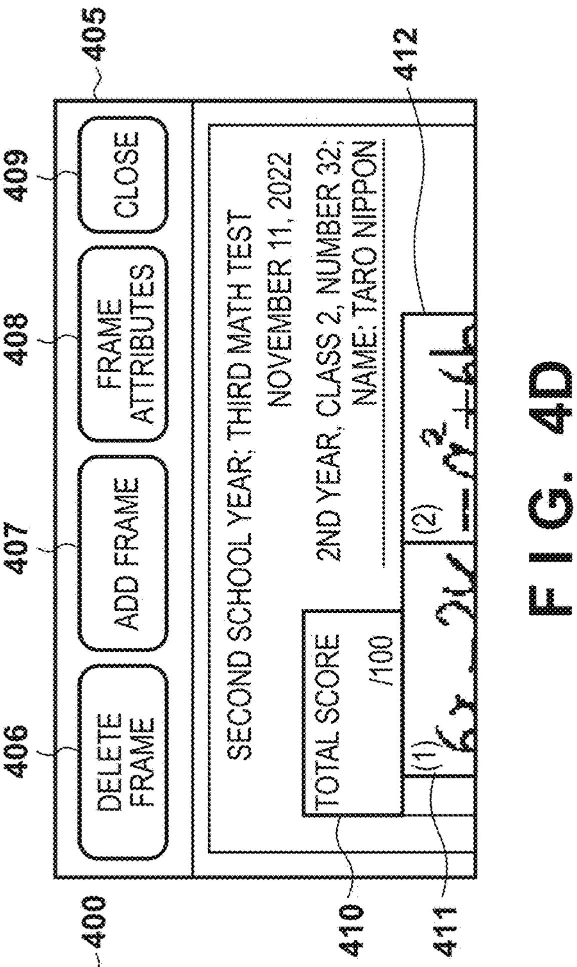
Figure 4C:
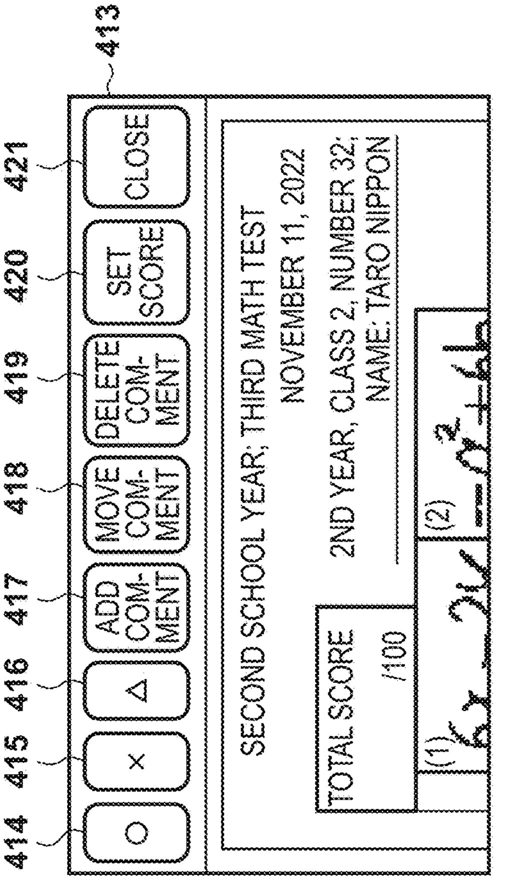
Figure 4D:
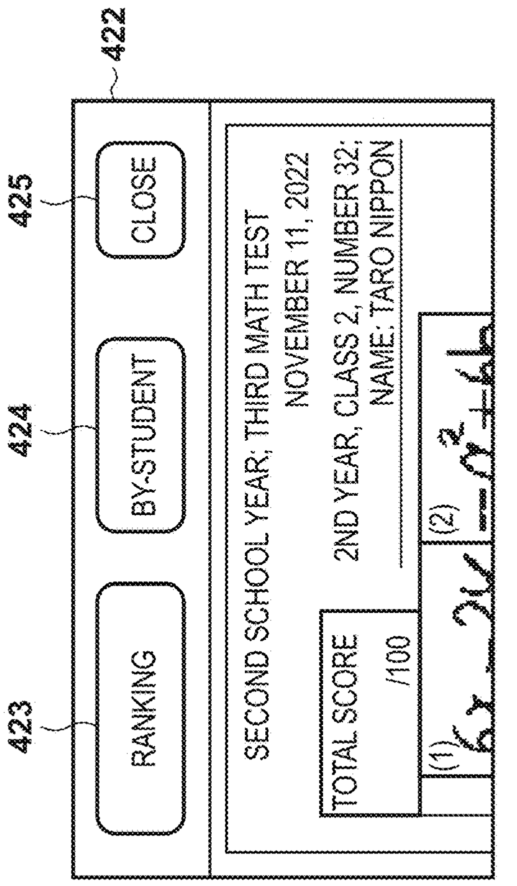
Figure 5A:
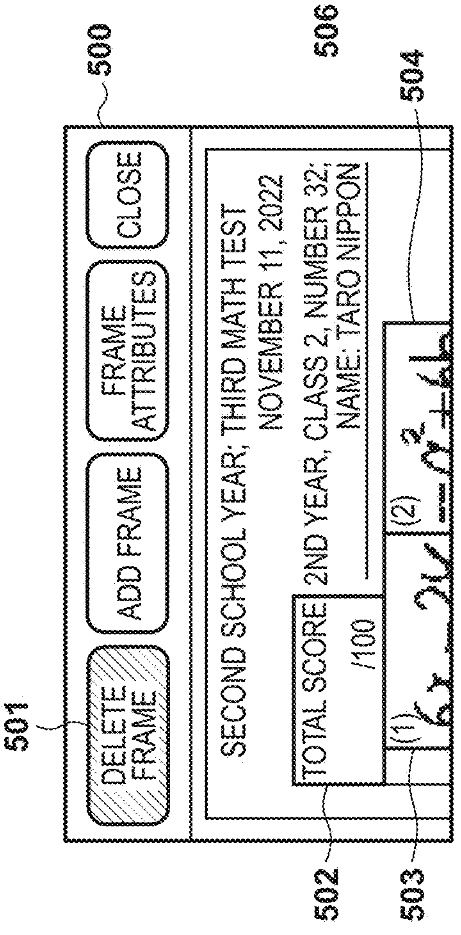
FIGS. 5A-5J are a diagram illustrating an exemplary RUI of a scoring assistance application according to an embodiment.
Figure 5B:
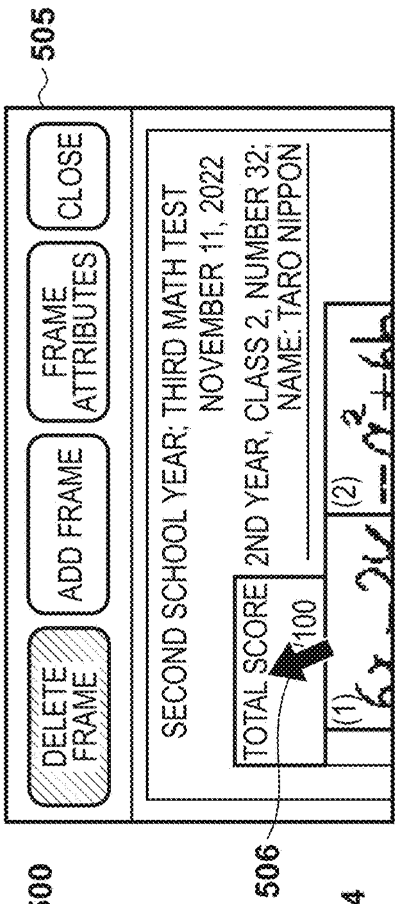
Figure 5C:
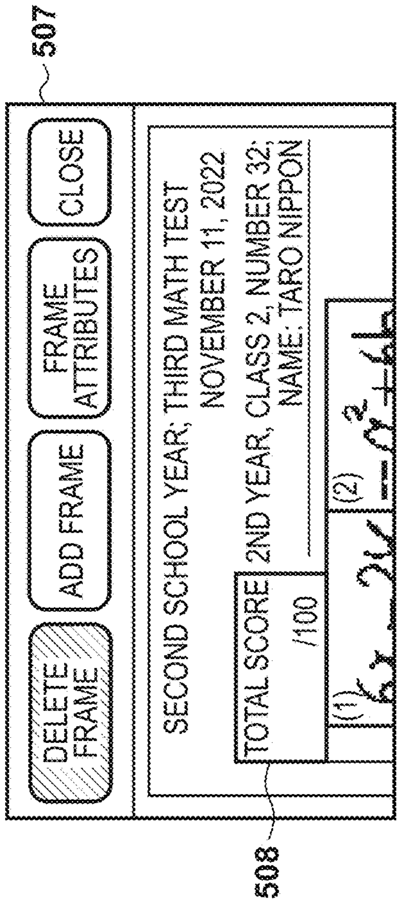
Figure 5D:
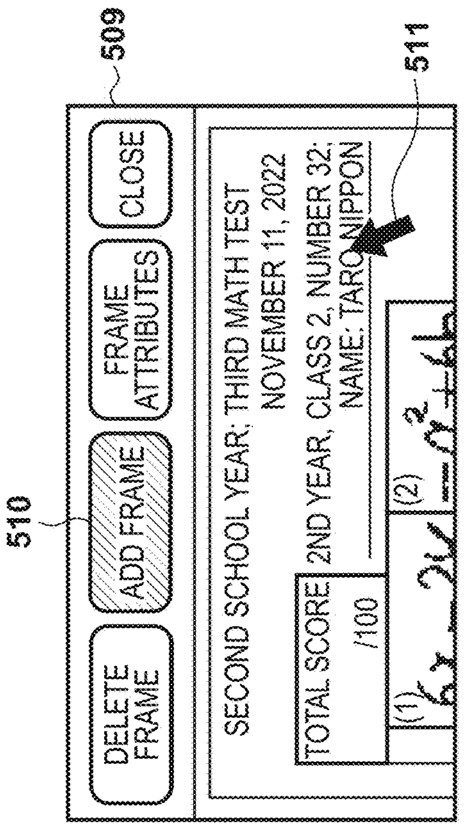
Figure 5E:
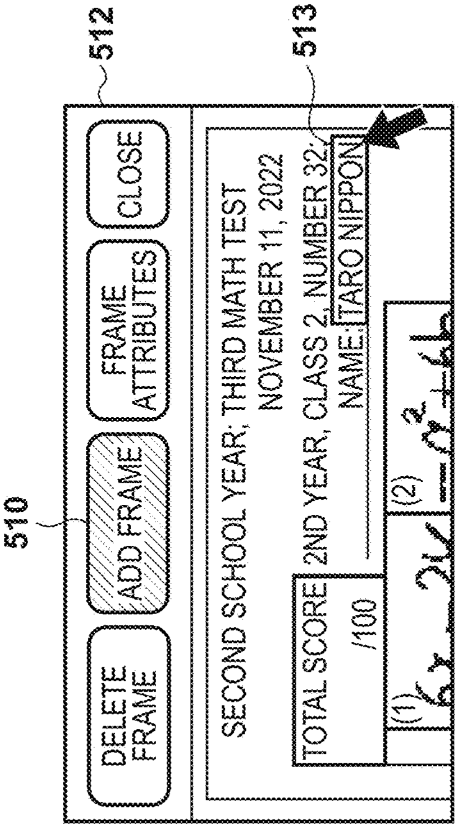
Figure 5F:
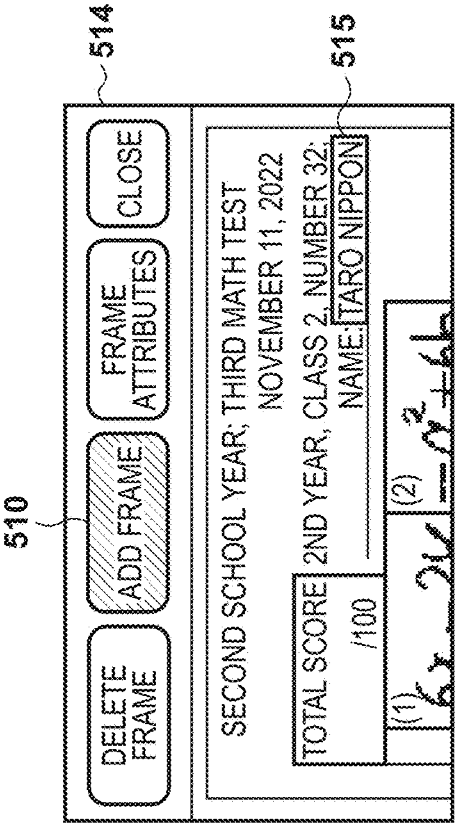
Figure 5G:
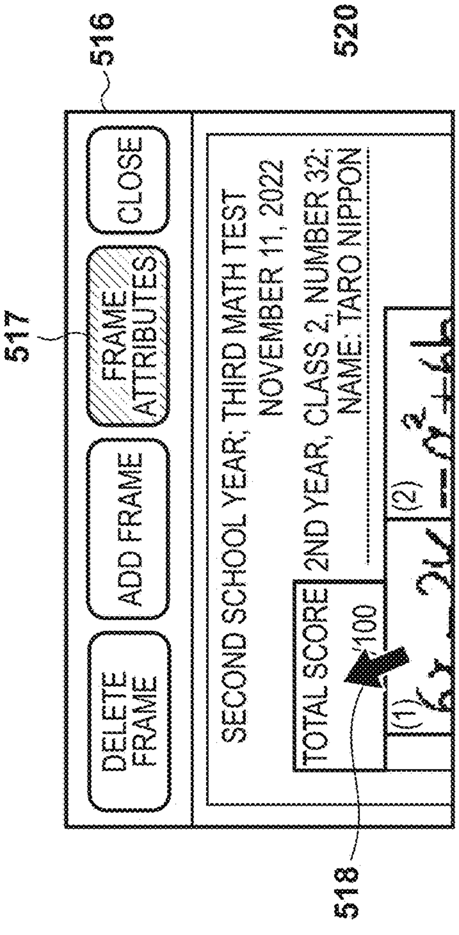
Figure 5H:
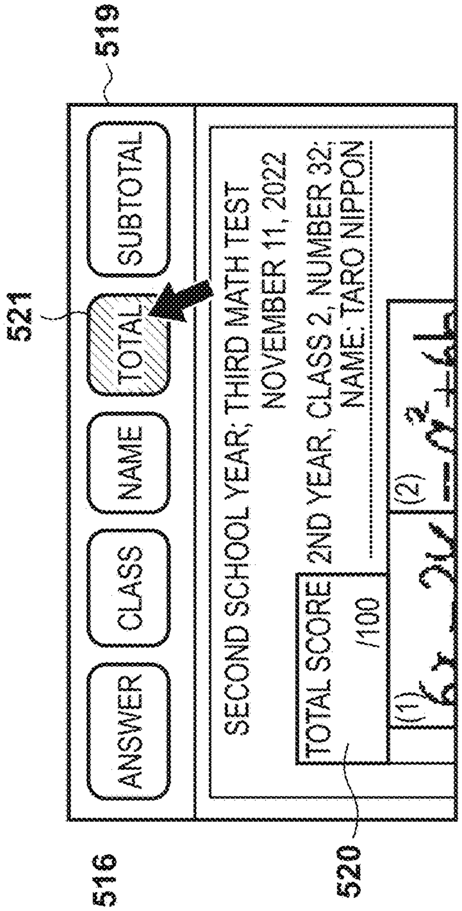
Figure 5I:
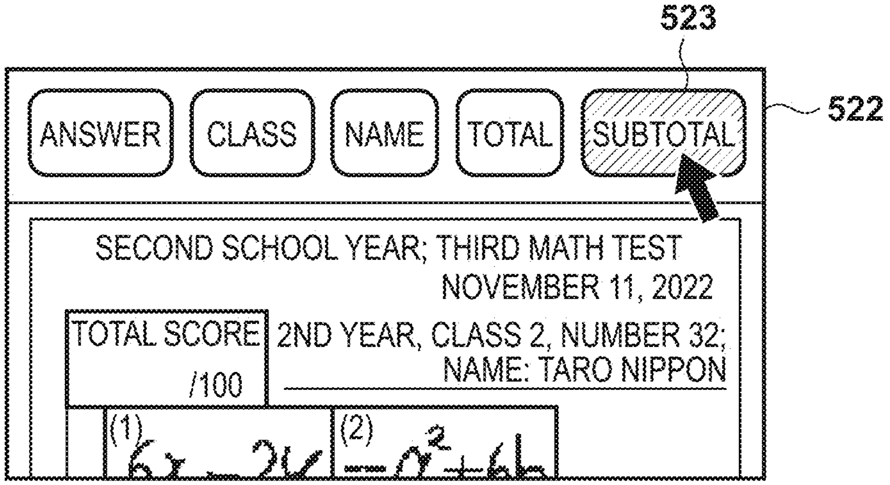
Figure 5J:
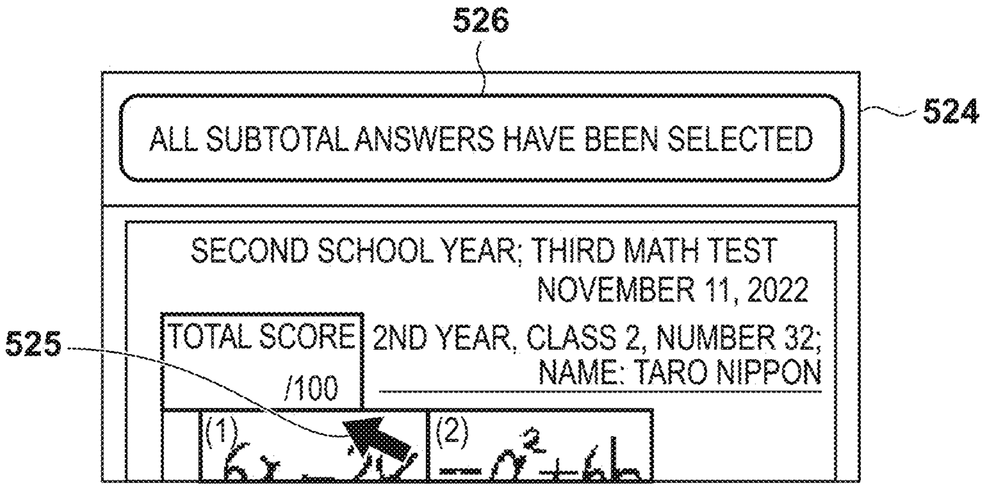

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

System Configuration

First, a configuration example of a system according to the present embodiment will be described with reference to FIG. 1. A system 117 according to the present embodiment is configured to include a multifunction peripheral 100 and an information device 110, and the apparatuses are connected to each other via a network 118 so as to be able to communicate with each other. In the present embodiment, a multifunction peripheral (MFP) 100 will be given as an example of an image processing apparatus. However, the present invention is not intended to be limited thereto, and a printing apparatus, a copying machine, a facsimile apparatus, or the like may be used. Further, the system according to the present embodiment may include other image processing apparatuses, information devices, and the like. The information device 110 is an information terminal such as a PC, a smart phone, or a tablet owned by a user. A user can access the multifunction peripheral 100 from the user's own information device 110 to confirm various kinds of information and use services.

The multifunction peripheral 100 provides various services to each information device that is connected via the network 118 so as to be able to communicate therewith. For example, the multifunction peripheral 100 may provide services such as printing, scanning, SEND, and image analysis. Here, "image analysis" refers to analysis of print data for printing a printed material and analysis of a read image obtained by reading a printed sheet. For example, it is possible to analyze regions to be filled in on a printed material on which predetermined items are printed and, by using a result of that analysis and a read image obtained by reading a filled-in sheet, provide a system for confirming business forms, application forms, and the like or an electronic scoring service. The "electronic scoring service" refers to a service for electronically performing scoring on a screen on which a read image obtained by reading a test answer sheet is displayed. According to the present embodiment, one or more predetermined regions such as an answer field, a subtotal score, a total score, and the like are analyzed in advance, and electronic scoring is performed using a read image obtained by reading the answer sheet after the test is taken and analysis information obtained by performing the analysis in advance. Thereafter, an answer sheet reflecting the scoring results, aggregation data, and the like is printed. Hereinafter, a rectangular shape will be described as an example of the above-described predetermined regions, but the shape is not particularly limited. Further, the term "frame" described below indicates an outer edge of a predetermined region. By setting a score in association with an answer field, it is possible to automatically output a subtotal score or a total score after electronic scoring. As a result, in the electronic scoring, the scorer can reduce work related to the scoring since the score will be automatically outputted simply by scoring the questions.

The multifunction peripheral 100 includes a CPU 101, a ROM 102, a DRAM 103, an operation unit 104, a scanner 105, a printer 106, a communication unit 107, and an image processing unit 108. The CPU 101 is a system control unit that controls the entire apparatus. In addition, the CPU 101 reads and executes a control program stored in the ROM 102. The ROM 102 is composed of a flash memory such as an eMMC and stores a control program of the CPU 101, image data, and the like. The DRAM 103 is a volatile memory that can temporarily store program control variables, image data to be processed, and the like. The ROM 102 and the DRAM 103 can also store frames obtained by analyzing the print data and region information indicating attributes thereof, which will be described below.

The operation unit 104 is a user interface unit that displays internal information of the multifunction peripheral 100 and receives user input via the displayed screens. The scanner 105 is a device that reads image data and converts the image data into binary data, and is used to read a document for an image send function and the like. The printer 106 is a device that performs fixing temperature control to fix an image according to print data onto a sheet, and then outputs the sheet.

The communication unit 107 is an interface unit between the multifunction peripheral 100 and an external communication network, and includes a network communication unit that is an interface to the network. The image processing unit 108 is configured to include an ASIC that performs image processing such as resolution conversion, compression/decompression, and rotation on the input image data and the output image data. The respective control units are connected to each other via a data bus 109, and can exchange data thereby with each other.

The information device 110 is a device that accesses the multifunction peripheral 100 and uses a service provided by the multifunction peripheral 100. For example, the information device 110 may activate an electronic scoring application to request the multifunction peripheral 100 to perform electronic scoring. The information device 110 is configured to include an operation unit 111, a browser 112, a CPU 113, a communication unit 114, and a ROM 115.

The operation unit 111 is a unit that serves as a user interface unit that displays internal information. Depending on the configuration of the information device 110, it also serves the function of accepting user input via respective displayed screens. When user input is received, the information is transmitted to the multifunction peripheral 100. The browser 112 is a module that interprets HTML and scripts and presents results to a user. By using the browser 112, it is possible to browse and edit data such as text and images.

The CPU 113 is a system control unit that controls the entire apparatus. The communication unit 114 is an interface unit between the device and an external communication network. The communication unit 114 includes a network communication unit that is an interface to the network, and a USB flash memory control unit that inputs to and outputs from a USB flash memory. The ROM 115 is composed of a flash memory such as an eMMC and stores a control program of the CPU 113, image data, and the like. The control units and modules are connected to each other via a data bus 116, and can exchange data with each other thereby.

<RUI Screen Example (Scoring Preparation Screens)>

Next, referring to FIGS. 2A-2E, RUI screens (scoring preparation screens) of the scoring assistance application according to the present embodiment will be described. An RUI screen is a screen on which screen information provided by the multifunction peripheral 100 is displayed by the information device 110. In this case, the CPU 101 of the multifunction peripheral 100 functions as a display control unit that transmits screen information to the information device 110 and receives, from the information device 110, operation information that is a user input via the respective screens. Here, RUI screens related to preparing for electronic scoring will be described. A top page screen 200 is a screen displayed when a page of the scoring assistance application is opened by accessing an IP address of the multifunction peripheral 100 from an information terminal such as a PC or a smart phone. RUI is an abbreviation of Remote User Interface.

In the top page screen 200, a page link 201 for preparing for electronic scoring and a page link 202 for performing electronic scoring are displayed so as to be selectable. By selecting these links, corresponding pages can be accessed. When the page link 201 is selected, a transition is made to a screen 203. The screen 203 illustrates an example of an electronic scoring preparation page. By accessing the screen 203, print data to be inputted for printing after the screen 203 is accessed can be pre-analyzed for electronic scoring. That is, in the case of printing an answer sheet on the multifunction peripheral 100, it is possible to analyze the print data for printing the answer sheet, and to recognize answer fields for the respective questions, score fields for filling in subtotals or a total score, and the like. In other words, "preparation for the electronic scoring" means that the print data of an answer sheet is analyzed and information for electronic scoring is acquired. A flow of processing therefor will be described later. A screen 204 illustrates an example of a screen displayed when a print job is inputted while the screen 203 is being displayed. Since the print job is inputted, a message indicating that the job is being analyzed for electronic scoring is displayed. Also, a screen 205 illustrates an example of a screen displayed when a print job electronic scoring analysis has been completed while the screen 204 is being displayed. The screen 205 displays to the user that the analysis is complete and preparation for electronic scoring is complete.

A screen 206 is a screen displayed by selecting the page link 202 for performing electronic scoring on the top page screen 200. By accessing the screen 206, a test for which to perform electronic scoring can be selected. In a case where the electronic scoring preparation is completed but the filled-in answer sheet has not been scanned, a message 207 prompting the user to scan the answer sheet is displayed on the screen 206.

<LUI Screen Example>

Next, referring to FIGS. 3A-3H, LUI screens of the scoring assistance application displayed on the operation unit 104 of the multifunction peripheral 100 according to the present embodiment will be described. LUI is an abbreviation of Local User Interface. A screen 300 is mainly displayed on the operation unit 104 immediately after the multifunction peripheral 100 is activated, and the user can select an icon displayed on the screen 300 to cause a screen registered for the icon to be displayed and use the function thereof. For example, by selecting an education assistance icon 301, a screen for performing an operation related to the education assistance application can be displayed.

A screen 302 illustrates an example of a screen displayed when the scoring assistance application is activated by selecting the education assistance icon 301. The screen 302 includes an answer sheet generation and print button 303, a score and aggregate button 304, and an end application button 305. When the generate and print answer sheet button 303 is operated, answer sheet generation and printing can be executed using the operation unit 104. When the score and aggregate button 304 is operated, a transition is made to a screen 306 for performing scanning and scoring of a completed answer sheet. When the end application button 305 is operated, the education assistance application can be ended.

The screen 306 illustrates an example of a screen that is displayed on the operation unit 104 of the multifunction peripheral 100 and that is for selecting a scoring method. When an automatic scoring button 307 is operated, a scanned image that is scanned by the scanner 105 is automatically scored and an aggregation process is performed. When an electronic scoring button 308 is operated, a transition is made to a screen 309 for selecting a test to be electronically scored.

The screen 309 illustrates an example of a screen that is displayed on the operation unit 104 of the multifunction peripheral 100 and that is for selecting a test to be electronically scored. A scan image is associated with a test selected on this screen. In a case where there are a plurality of tests to be electronically scored, a plurality of candidates are selectably displayed, such as a test A selection button 310 and a test B selection button 311. For example, in a case where the test A selection button 310 is operated, a transition is made to a screen 312.

The screen 312 illustrates an example of a screen that is displayed on the operation unit 104 of the multifunction peripheral 100 and that is for scanning a test answer sheet to be electronically scored. When a start button 313 is operated, the answer sheet is scanned using the scanner 105. On the screen 312, a test name selected on the screen 309 is displayed. This allows re-confirmation of a test name associated with the user.

A screen 314 illustrates an example of a screen that is displayed on the operation unit 104 of the multifunction peripheral 100 while scanning a test answer sheet to be electronically scored. The screen 314 is displayed until scanning is completed. After the scanning is complete, a transition is made to a screen 315 automatically. On the screen 315, a message indicating that scanning is complete and that electronic scoring is possible is displayed. When the scanning is completed, the screen 315 is automatically displayed for a predetermined time, and then a transition to the screen 302 is made automatically.

A screen 316 is an example of a screen for selecting electronic scoring after completion of the electronic scoring scan for the test A, for an example. The screen 316 is an RUI screen displayed on the display unit of the information device 110. In comparison with the screen 206, since the test A has been scanned, a thumbnail image is displayed as indicated by a test A selection button 317, and electronic scoring can be requested from the multifunction peripheral 100 by operating the button 317. Note that since a test B has not been scanned, text prompting the user to scan the answer sheet is displayed as indicated by a test B selection button 318. Therefore, electronic scoring cannot be performed even if the button 318 is operated.

<RUI Screen Example (Scoring Execution Screen)>

Next, referring to FIGS. 4A-4D, an example of RUI screens (scoring execution screens) of the scoring assistance application according to the present embodiment will be described. Here, screens on which electronic scoring of the scoring assistance application is performed will be described. In the present embodiment, electronic scoring of a test is described as an example, but the present invention is not intended to be limited thereto. That is, the present invention can be applied to a system in which a scanner reads in a filled-in printed material sheet on which predetermined items have been printed, the read image is displayed on a screen and confirmed, a confirmation result is received in response to a user input, and the confirmation result is superimposed on the read image and the result of the superimposing is displayed. The superimposition of the confirmation result on the read image may be performed as a control that embeds an object indicating the confirmation result into the read image. For example, the present invention can be applied to a system in which, in addition to electronic scoring of a test, a read image obtained by scanning an arbitrary entry sheet such as a business form or an application form is displayed to allow confirmation thereof, and a confirmation result, such as information indicating whether or not an entry is appropriate, is composited with the read image.

A screen 400 illustrates an example of a screen that is transitioned to when a score button for an electronically scorable test displayed on an electronic scoring selection page, for example the button 318 on the screen 316, is operated. On the screen 400, when a set frame button 401 is operated, a transition is made to a screen 405, and a setting of a frame for performing electronic scoring can be performed. When a score button 402 is operated, a transition is made to a screen 413, and electronic scoring can be performed. When a result button 403 is operated, a transition is made to a screen 422, and electronic scoring results can be outputted. A document image 404 is displayed at the lower portion of the page, and scoring content and comments can be confirmed.

The screen 405 is a screen for setting a frame for designating a region such as an answer field or a subtotal or total field required for performing electronic scoring. Here, the "frame" is an object indicating an outer edge of a predetermined region, and a "frame" is superimposed on the document image 404 and the result of the superimposing is displayed. On the screen 405, a set frame can be deleted by operating a delete frame button 406. When an add frame button 407 is operated, a new region can be designated and a frame can be added therein. Attributes such as whether the target frame indicates an answer field or a subtotal field can be set by operating a frame attribute button 408. When a completion button 409 is operated, the set frame information is saved and a transition is made to the screen 400. Further, because operable frames 410 to 412 are displayed on the document image on the screen 405, the user can recognize the processing target frame. The frames 410 to 412 may be displayed to be highlighted by changing a color or causing them to blink. Note that an example of screens for each button operation will be described later with reference to FIGS. 5A-5J.

The screen 413 is a screen for performing electronic scoring, such as scoring answers or writing comments. On the screen 413, it is possible to set correct as a scoring result by operating a correct button 414. It is possible to set incorrect as a scoring result by operating an incorrect button 415. It is possible to set partially correct as a scoring result by operating a partially correct button 416. An add comment button 417 can be operated to add a comment. A move comment button 418 can be operated to move the location of a selected comment. A delete comment button 419 can be operated to delete a selected comment. A set score button 420 can be operated to confirm and set correct, incorrect, and partially correct scores in the test. When a completion button 421 is operated, the setting information is saved and a transition is made to the screen 400. Note that an example of screens for each button operation will be described later with reference to FIG. 6.

The screen 422 illustrates a screen for outputting results of electronic scoring. When a ranking button 423 is operated, student information sorted in descending order of score can be outputted. When a by-student button 424 is operated, the scoring results for each student can be outputted. When a completion button 425 is operated, a transition is made to the screen 400. Note that a processing flow at the time of each button operation will be described later with reference to FIGS. 14A-14D.

<RUI Screen Example (Frame Setting Screen)>

Next, referring to FIGS. 5A-5J, an example of RUI screens (frame setting screens) of the scoring assistance application according to the present embodiment will be described. Here, detailed display control of the screen 405 when the set frame button 401 is operated on the screen 400 will be described.

A screen 500 illustrates an example of a screen for deleting frame information. Since a delete frame button 501 has already been selected, it is grayed out. A plurality of selectable frames 502 to 504 are highlighted. A screen 505 illustrates an example of a screen for selecting a frame information deletion target. The user operates a pointer 506 displayed on the screen 505 to select a target frame. The pointer 506 can be operated using the operation unit 111 of the information device 110, for example, a touch panel device, a pointing device, or the like. The screen 505 illustrates a state in which a frame 502 is selected via the pointer 506. As described above, the user can select a frame to be deleted by aligning the pointer 506 with the frame to be deleted and performing an operation, for example, a click operation or a touch operation. A screen 507 illustrates an example of a screen after a frame information deletion target is selected. As illustrated at reference numeral 508, the frame 502 selected on the screen 505 is deleted, and it can be confirmed that there is no frame.

A screen 509 illustrates an example of a screen for adding frame information. Since an add frame button 510 has already been selected, it is grayed out. The user can set a new frame on the read-in document image via a pointer 511 in a state where the add frame button 510 has been selected. For example, a frame can be added, using the position of the pointer 511 as a starting point, by a click operation or a touch operation. In the following description, a click operation or a touch operation is simply referred to as a click operation or the like. A screen 512 illustrates an example of a screen for setting an end position of a frame. For example, a position of a pointer 513 is applied as the end point of the frame by releasing the click or releasing the touch. That is, the user decides the start point of the frame (for example, the upper left corner of the rectangular frame) by a click operation or the like at the position indicated by the pointer 511. Further, the user moves the pointer 511 to the position of the pointer 513 by a drag operation or a swipe operation, and decides the end point of the frame (the lower right of the rectangular frame) by a click releasing operation or a new click operation during the operation. By this series of operations, a rectangular frame can be designated. A screen 514 illustrates an example of a screen after the end position of the frame has been set. It can be confirmed that a frame is set as a region 515 surrounding the start point set by the click or the like and the end point set by the click release.

A screen 516 illustrates an example of a screen for designating a target associated with the selected frame as an attribute such as an answer field or a total field. Since a frame attribute button 517 has already been selected, it is grayed out. A user operates a pointer 518 and selects a target frame by a click operation or the like in a state in which the frame attribute button 517 is selected. Here, a situation in which the frame 502 is selected is illustrated. A screen 519 illustrates an example of a screen for selecting an attribute to be set for a frame selected via the pointer 518. In the screen 519, only the selected frame is highlighted as indicated by reference numeral 520, and various attributes can be selected. For example, in a case where the total field is to be selected as an attribute, a total button 521 need only be operated. By operating the total button 521, an attribute indicating a total field is set for the frame, and then the screen automatically transitions to the screen 516.

Meanwhile, a screen 522 illustrates an example of a screen for selecting a subtotal field as an attribute to be set for the selected frame. By operating a subtotal button 523, a subtotal field attribute is set for the frame. Since it is necessary to select a frame to be a subtotal target, the screen automatically transitions to a screen 524 after the button is operated. The screen 524 illustrates an example of a screen for selecting a frame to be a subtotal target. A frame at the position of a pointer 525 can be selected by a click operation or the like. By operating a selected button 526 after selecting all frames, frames to be a subtotal target can be finalized.

<RUI Screen Example (Correct Setting Screen)>

Figure 6A:
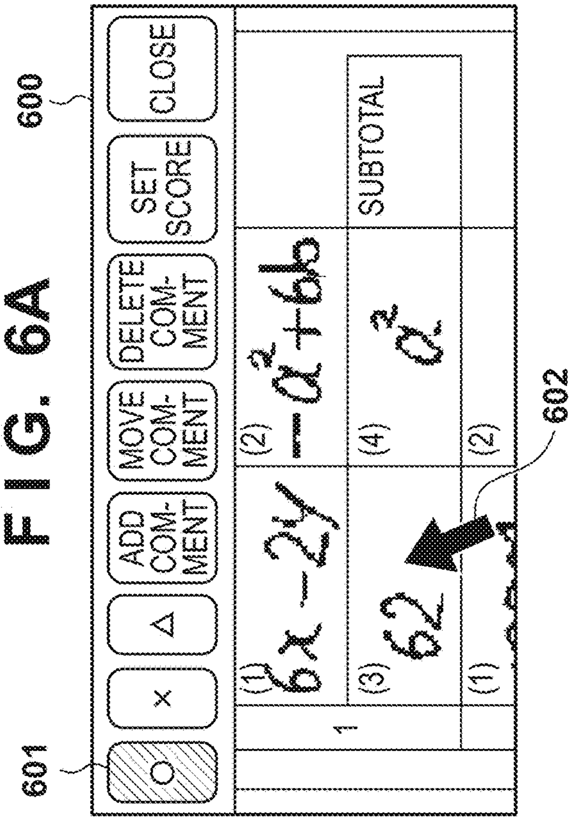
FIGS. 6A-6N are a diagram illustrating an exemplary RUI of a scoring assistance application according to an embodiment.
Figure 6B:
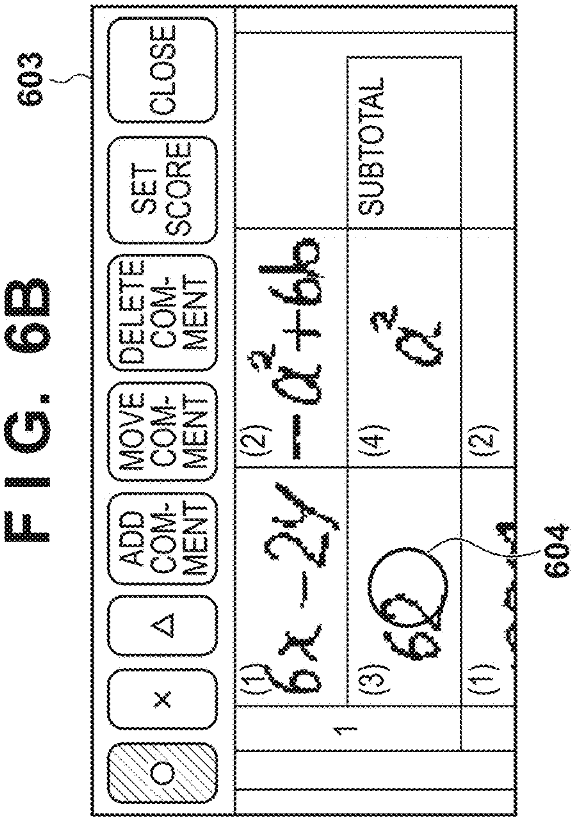
Figure 6C:
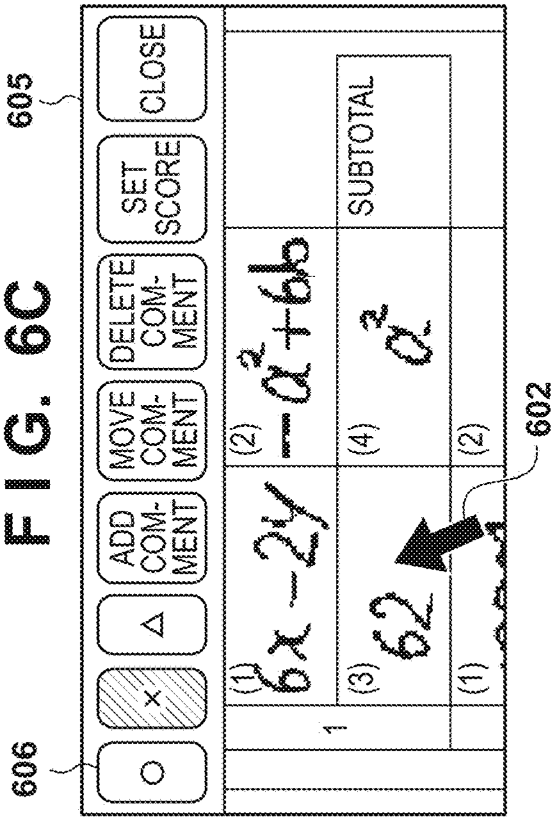
Figure 6D:
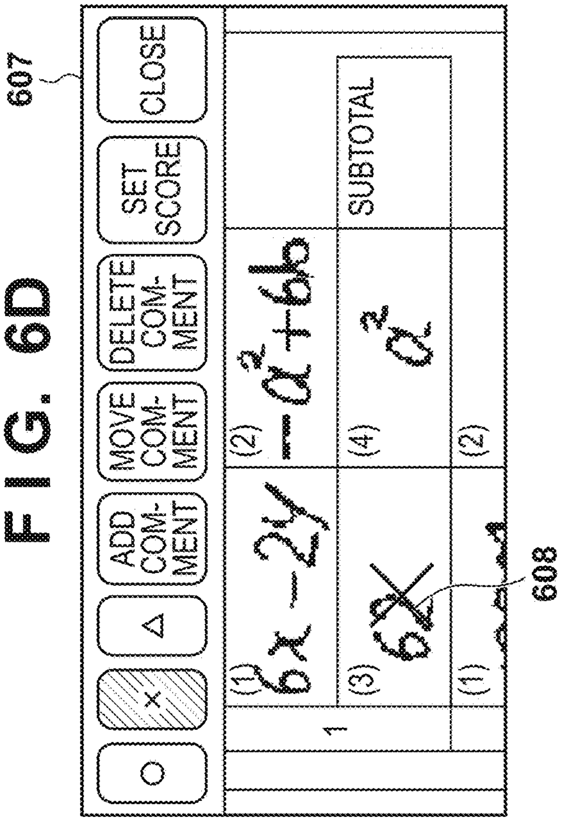
Figure 6E:
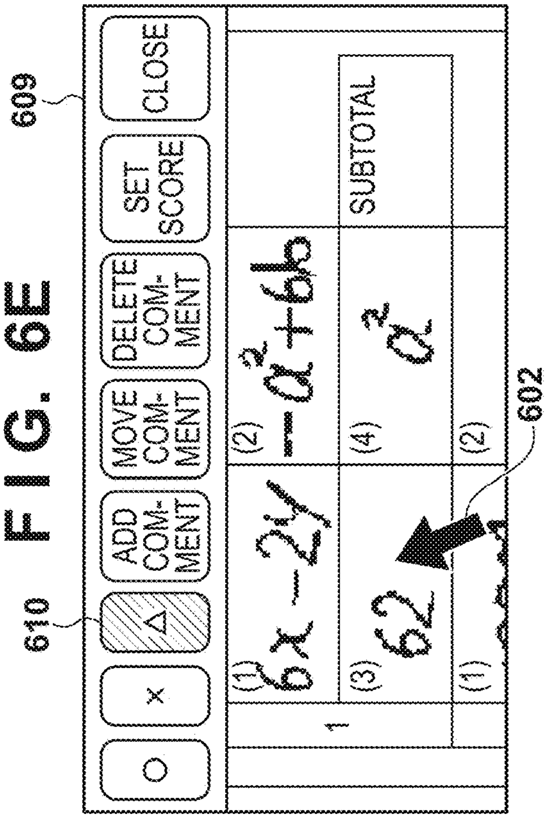
Figure 6F:
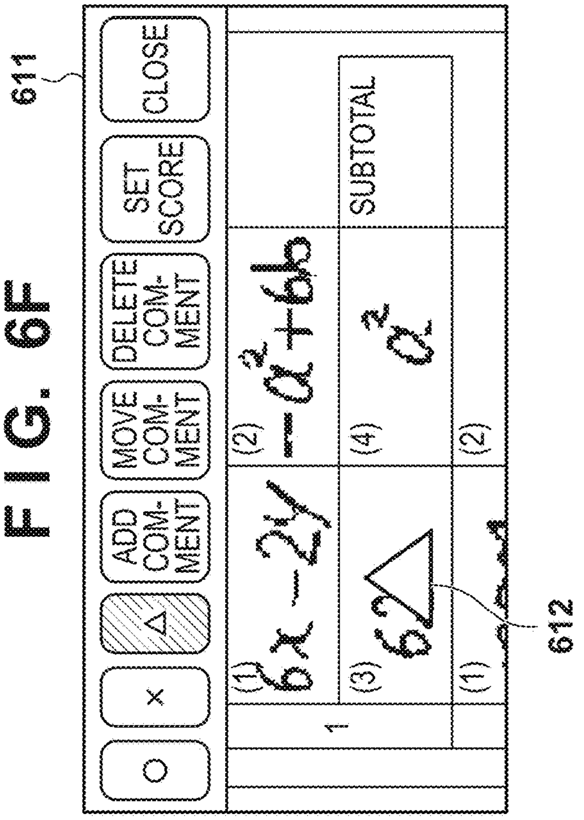
Figure 6G:
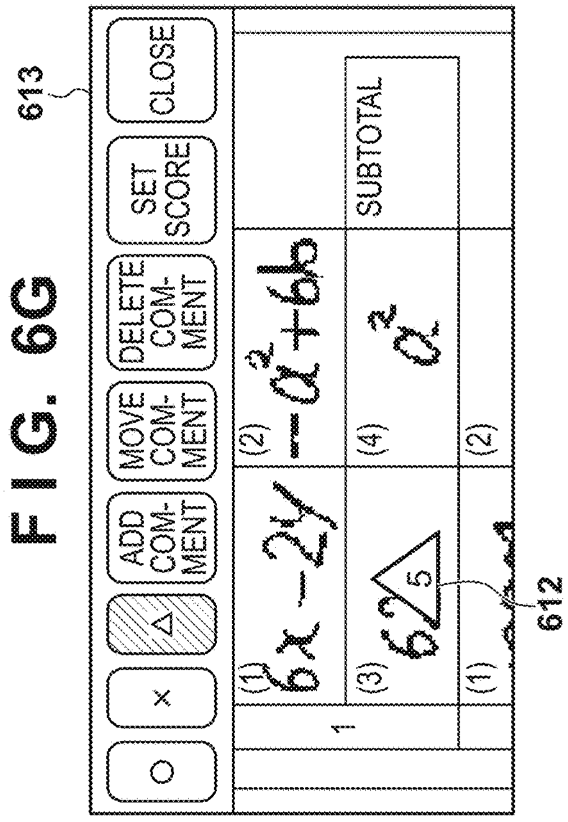
Figure 6H:
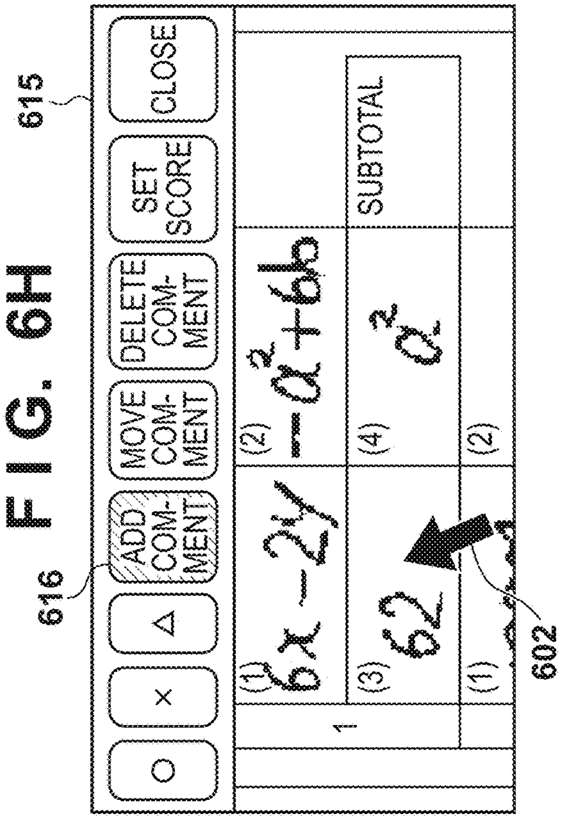
Figure 6J:
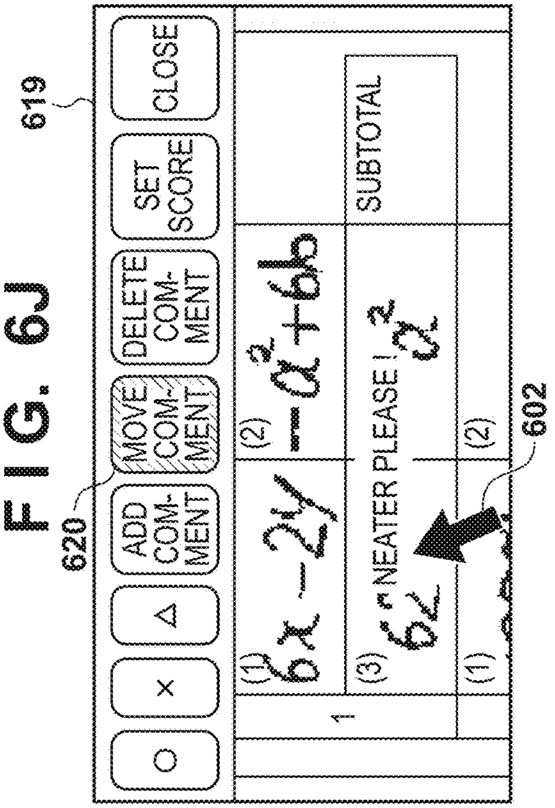
Figure 6I:
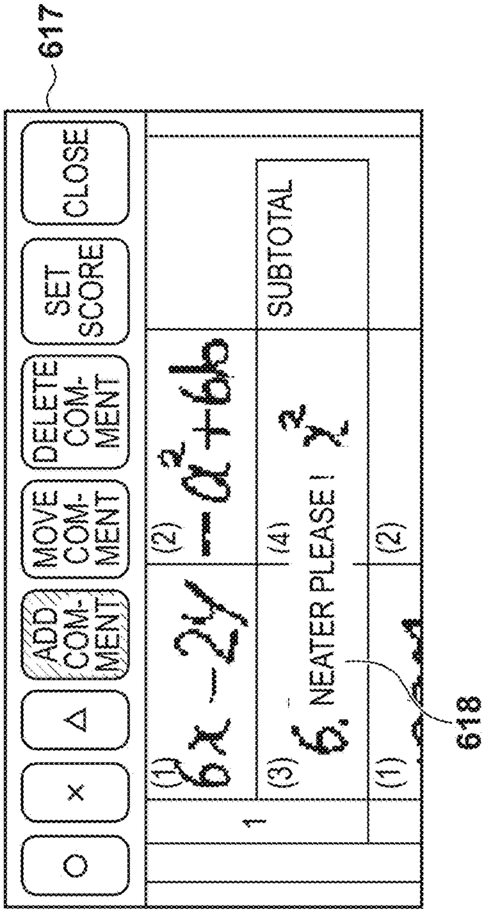
Figure 6L:
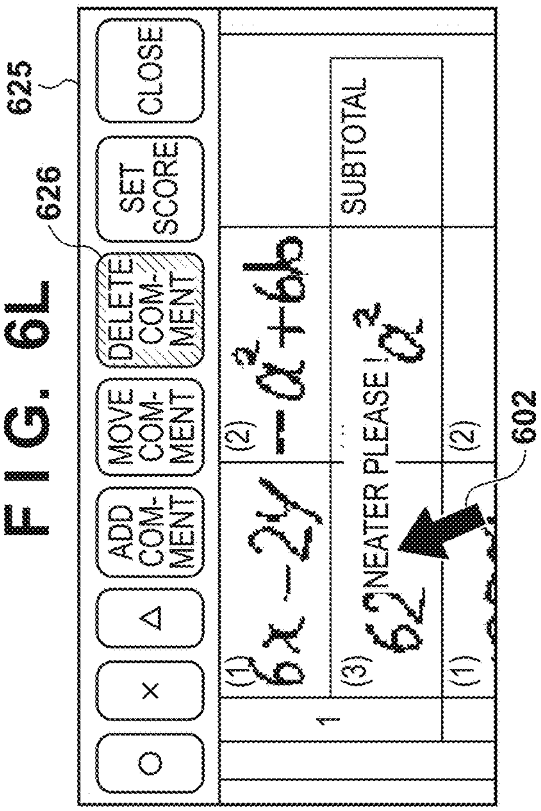
Figure 6K:
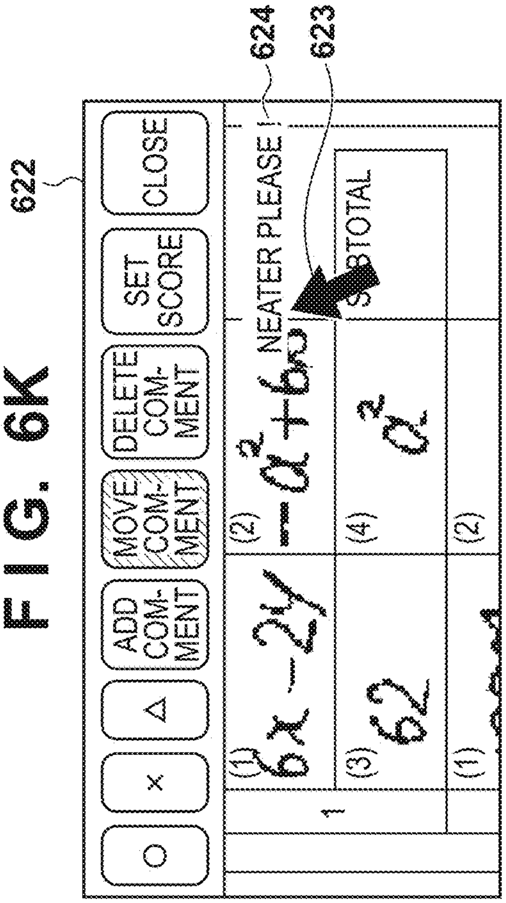
Figure 6M:
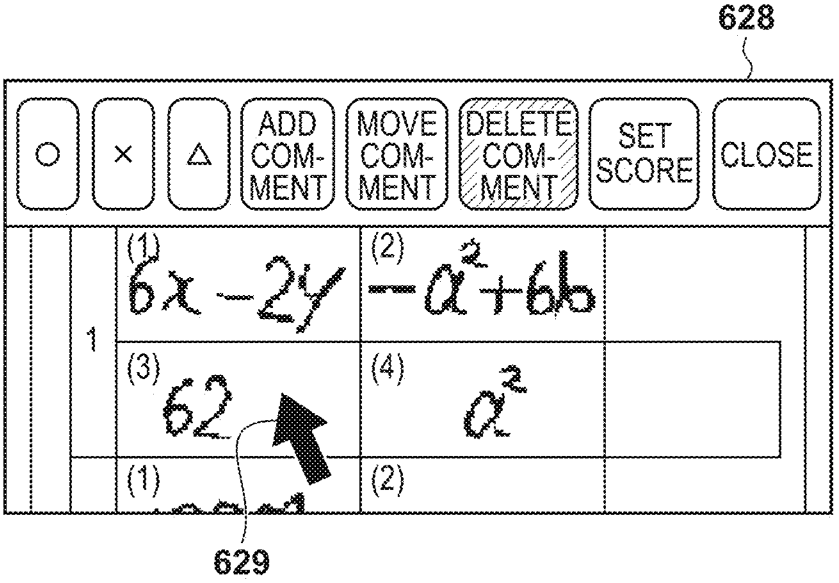
Figure 6N:
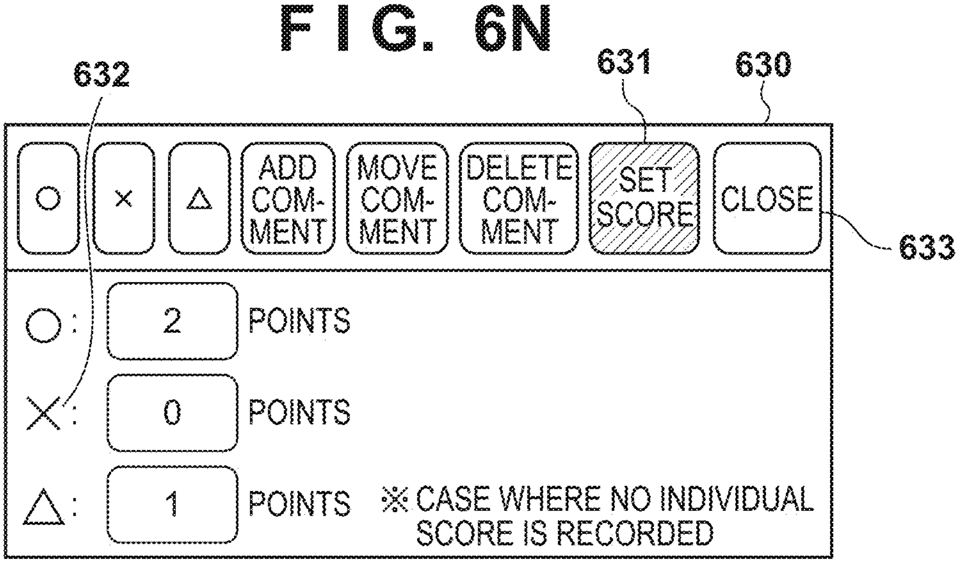

Next, referring to FIGS. 6A-6N, an example of RUI screens (correct setting screens) of the scoring assistance application according to the present embodiment will be described. Here, detailed display control of the screen 413 when the score button 402 is operated on the screen 400 will be described. Here, "correct setting" refers to a setting of correct for a question in a test.

A screen 600 illustrates an example of a screen for setting correct as a scoring result. Since a correct button 601 has already been selected, it is grayed out. Correct can be set for the frame at the position of a pointer 602 by a click operation or the like. A screen 603 illustrates an example of a screen after correct has been set as a scoring result. A shape (for example, a circular object indicating the scoring result) 604 indicating correct is drawn at the center of the frame for which correct has been set.

A screen 605 illustrates an example of a screen for setting incorrect as a scoring result. Since an incorrect button 606 has already been selected, it is grayed out. Incorrect can be set for the frame at the position of the pointer 602 by a click operation or the like. A screen 607 illustrates an example of a screen after incorrect has been set as a scoring result. A shape (for example, an X shaped object indicating the scoring result) 608 indicating incorrect is drawn at the center of the frame for which incorrect has been set.

A screen 609 illustrates an example of a screen for setting partially correct as a scoring result. Since a partially correct button 610 has already been selected, it is grayed out. Partially correct can be set for the frame at the position of the pointer 602 by a click operation or the like. A screen 611 illustrates an example of a screen after partially correct has been set as a scoring result. A shape (for example, a triangular shape object indicating the scoring result) 612 indicating partially correct is drawn at the center of the frame for which partially correct has been set. A screen 613 illustrates a variation example of a screen after partially correct has been set as a scoring result. It is possible to input a score of partially correct, and the inputted score is drawn at a center 614 of the shape indicating partially correct. Here, an example in which a score "5" inputted at the center of a triangular object is drawn is illustrated.

A screen 615 illustrates an example of a screen for adding a comment. Since an add comment button 616 has already been selected, it is grayed out. It is possible to add a comment at the position of the pointer 602 by a click operation or the like. A screen 617 illustrates an example of a screen after the comment addition position has been set. A comment can be input at a designated position 618, and the inputted comment is drawn from the designated position 618. Here, an example in which "neater please!" is drawn as a comment is illustrated. Note that the character string of the comment is also an example of an object indicating the scoring result (confirmation result).

A screen 619 illustrates an example of a screen for moving a comment. Since a move comment button 620 has already been selected, it is grayed out. It is possible to select a comment at the position of the pointer 602 as a move target by a click operation or the like. A screen 622 illustrates an example of a screen after the comment has been moved. It is possible to move a comment at the position of the pointer 623 by a click release or the like. A moved comment 624 is redrawn at the position after the movement.

A screen 625 illustrates an example of a screen for deleting a comment. Since a delete comment button 626 has already been selected, it is grayed out. It is possible to select a comment at the position of the pointer 602 as a deletion target by a click operation or the like. A screen 628 illustrates an example of a screen after the comment has been deleted. Since the deletion target comment is deleted, it can be confirmed that nothing is drawn in a region 629 in which the comment existed.

A screen 630 illustrates an example of a screen for setting a score allocation for correct, incorrect, and partially correct (if no score is inputted). Since a set score button 631 has already been selected, it is grayed out. The current score allocation settings 632 for correct, incorrect, and partially correct (if no score is inputted) are displayed, and the score allocation can be confirmed and updated. Here, it indicates that correct is set to 2 points, incorrect is set to 0 points, and partially correct is set to 1 point. By operating a completion button 633, the set scoring is stored, correct setting is ended, and the screen 400 is returned to.

<Data Structure of Scoring Information>

Next, with reference to FIGS. 7A-7B, a data structure for holding scoring information by electronic scoring according to the present embodiment will be described. Reference numeral 700 denotes a data structure for holding scoring data. Reference numeral 701 denotes specific scoring information held by using the data structure.

The data structure 700 can hold basic information related to the entire test, such as a test name (title), a path of an image, a data generation/update date and time, and score allocation information; scoring information such as a document path for each student; student information; frame information; and comment information for the document. Scoring information 701 indicates a state in which specific information is set for each element of the data structure 700. In the example of the scoring information 701, information about one student is set, but respective information about a plurality of students may be included. In this way, in a case where the electronic scoring is performed, the information of the structure is operated.

<Processing Procedure for Printing Answer Sheet>

(Basic Flow)

Figures 8A, 8B, 8C, 8D:
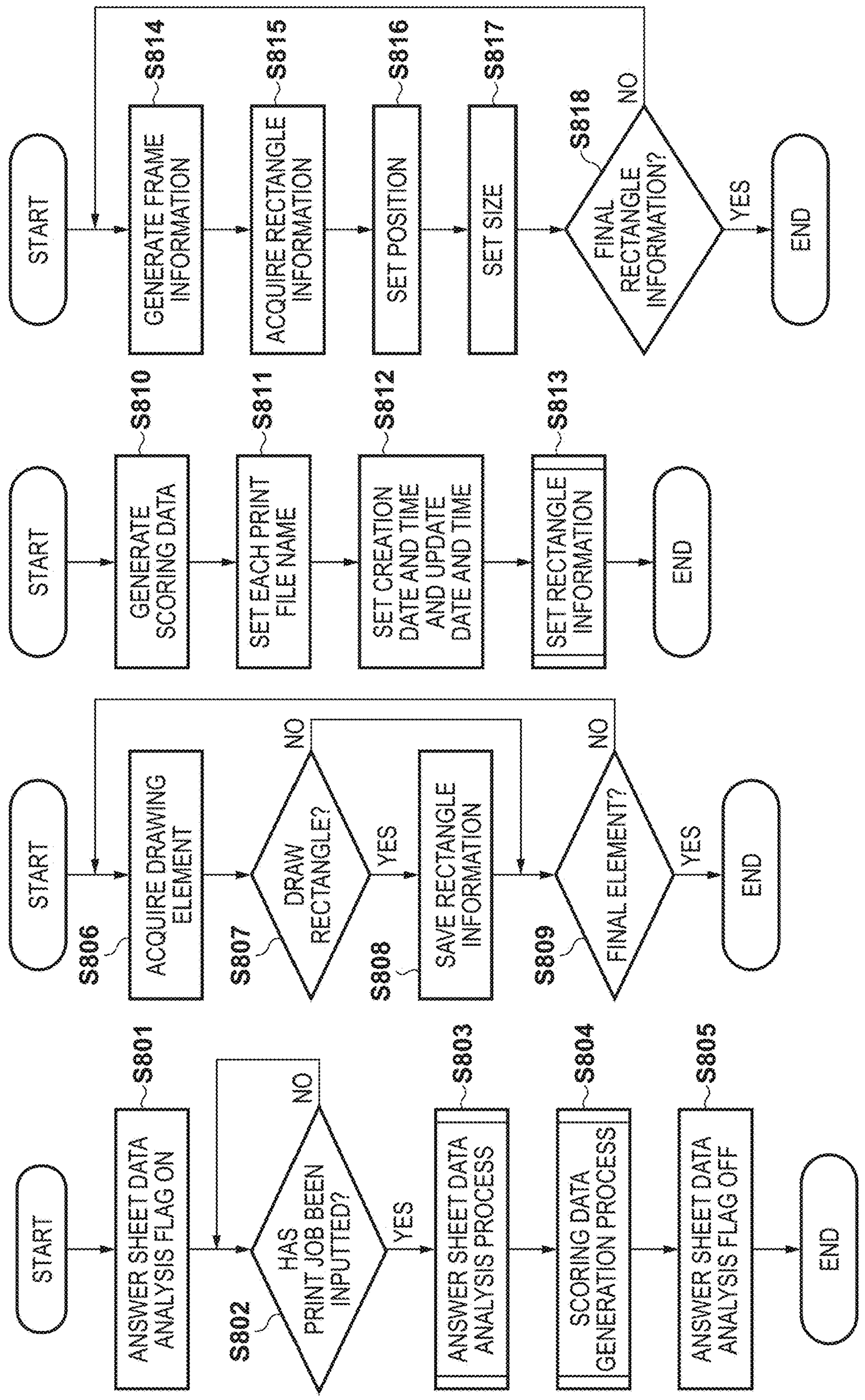
FIGS. 8A to 8D are flowcharts regarding an answer sheet printing process according to an embodiment.

Next, with reference to FIGS. 8A to 8D, a processing procedure for printing an answer sheet by the multifunction peripheral 100 according to the present embodiment will be described. The process described below is realized by, for example, the CPU 101 reading a program stored in the ROM 102 into the DRAM 103 and executing the program. FIG. 8A illustrates a basic flow for printing of an answer sheet by the multifunction peripheral 100 according to the present embodiment. In this flow, control for analyzing print data (hereinafter, the answer sheet data) is performed when an answer sheet is printed. Here, control for executing, on the multifunction peripheral 100, processes requested via the RUI screens 203 to 205 for the electronic scoring preparation in the scoring assistance application will be described.

In step S801, the CPU 101 receives an instruction to prepare for electronic scoring from a user via the communication unit 107 via the screen 200, sets an answer sheet data analysis flag to on, and advances the process to step S802. In step S802, the CPU 101 monitors whether a print job has been inputted via the communication unit 107. In a case where a print job has been inputted, the process proceeds to step S803. In a case where the print job has not been inputted, the process of step S802 is repeated to monitor for input.

In step S803, the CPU 101 executes a process for analyzing answer sheet data of the print job inputted via the communication unit 107, and advances the process to step S804. Details of the process for analyzing the answer sheet data will be described later with reference to FIG. 8B. In step S804, the CPU 101 executes a process for generating scoring data, and advances the process to step S805. Details of the scoring data generation process will be described later with reference to FIG. 8C. Next, in step S805, the CPU 101 sets the answer sheet data analysis flag to off, and ends the process of this flowchart.

(Print Data Analysis Processing)

FIG. 8B illustrates a detailed procedure of the answer sheet data analysis process (step S803) performed by the multifunction peripheral 100 according to the present embodiment. In this flow, analysis control for extracting rectangle information from the inputted answer sheet data is performed.

In step S806, the CPU 101 acquires a drawing element from answer sheet data, and advances the process to step S807. Note that the drawing element described here indicates a shape or text drawing command described in the answer sheet data in order to draw the answer sheet on the multifunction peripheral 100. Subsequently, in step S807, the CPU 101 determines whether or not the acquired drawing element is a rectangular drawing element. In a case where it is a rectangular drawing element, the process proceeds to step S808, and in a case where it is not a rectangular drawing element, the process proceeds to step S809. Note that the process of determining the rectangle information may be performed using a general known print data drawing process. For example, in a case where print data is generated by PostScriptV3 developed by Adobe, a rectangle is drawn by a rectstroke instruction, and thus a rectangle drawing determination can be made by confirming the presence of that instruction. Further, although a rectangular drawing element is described as an example, the present invention is not intended to be limited thereto. The drawing element may include a predetermined region on a printed material and the present invention is not particularly limited to a rectangular shape.

In step S808, the CPU 101 saves the rectangle information in a drawing element in the DRAM 103 and advances the process to step S809. In step S809, the CPU 101 determines whether or not the acquired drawing element is the final element. In the case of the final element, the processing of this flowchart is ended. Meanwhile, in a case where it is not the final element, the process proceeds to step S806 to confirm all elements.

(Scoring Data Generation Process)

FIG. 8C illustrates a detailed procedure of the scoring data generation process (step S804) performed by the multifunction peripheral 100 according to the present embodiment. In this flow, control is performed to generate scoring data corresponding to a print job of the inputted answer sheet.

In step S810, the CPU 101 executes a process for generating scoring data, and advances the process to step S811. Note that the generated scoring data has the same data structure as the format illustrated in the data structure 700, and is in a state before the data is set to each element. In step S811, the CPU 101 sets the print file name as the title of the generated scoring data, and advances the process to step S812. In step S812, the CPU 101 sets the creation date and time and the update date and time of the generated scoring data to the current time, and advances the process to step S813. In step S813, the CPU 101 sets the rectangle information in the scoring information, stores the scoring data in the ROM 102, and ends the process of this flowchart. Details of the rectangle information setting process will be described later with reference to FIG. 8D.

(Processing for Setting Rectangle Information)

FIG. 8D illustrates a detailed procedure of a process for setting rectangle information in scoring information (step S813) performed by the multifunction peripheral 100 according to the present embodiment. In this flow, control is performed to set the stored rectangle information as the scoring information.

In step S814, the CPU 101 generates frame information, and advances the process to step S815. The frame information generated here includes information such as the position and size of the frames, attribute information, scoring results, individual scores, and attribute detail information. In other words, "frame" refers to a predetermined region on the printed material, and indicates a region to be filled in after printing. For example, there are frames such as an answer field, a subtotal field, and a total field. In step S815, the CPU 101 reads the rectangle information from the DRAM 103 and advances the process to step S816. The rectangle information is information stored in the DRAM 103 in above-described step S808.

In step S816, the CPU 101 acquires the position from the rectangle information, sets the position in the frame information, and advances the process to step S817. In step S817, the CPU 101 acquires the size from the rectangle information, sets the size in the frame information, and advances the process to step S818. In step S818, the CPU 101 determines whether or not the acquired rectangle information is the final rectangle information. In the case of the final rectangle information, the processing of this flowchart is ended. In a case where it is not the final piece of rectangle information, the processing is returned to step S814 in order to process all the rectangle information.

<Processing Procedure at the Time of Reading Answer Sheet> (Basic Flow)

Figure 9A:
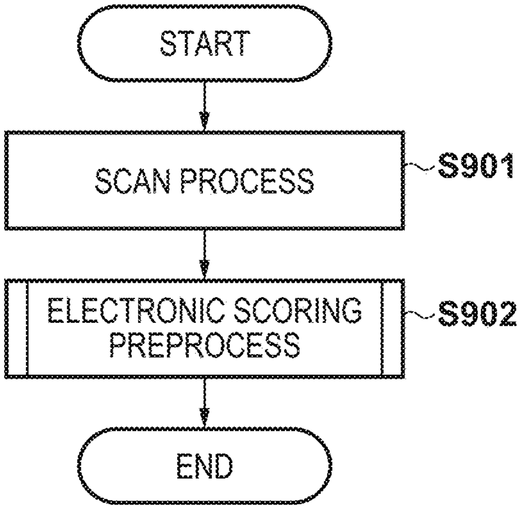
FIGS. 9A to 9C are flowcharts regarding an answer sheet scanning process according to an embodiment.

Next, with reference to FIGS. 9A to 9C, a processing procedure for reading an answer sheet on the multifunction peripheral 100 according to the present embodiment will be described. The process described below is realized by, for example, the CPU 101 reading a program stored in the ROM 102 into the DRAM 103 and executing the program. FIG. 9A illustrates a processing procedure for a basic flow when reading an answer sheet by the multifunction peripheral 100 according to the present embodiment. In this flow, control is performed for a scan process and the electronic scoring preprocess sequence when an answer sheet is read. Here, control executed on the multifunction peripheral 100 while the LUI screens 312 and 314 for the electronic scoring preparation in the scoring assistance application are being displayed will be described.

In step S901, the CPU 101 receives a scan execution instruction from the user, performs a scan process using the scanner 105, and advances the process to step S902. The "scan process" described here is the same as a scan process performed by a general multifunction peripheral 100, and is realized by a known method, and the image is stored in the ROM 102. The above-described scan execution instruction is executed by operating the start button 313 on the screen 312. In step S902, the CPU 101 performs a preprocess for electronic scoring, and ends the processing of this flowchart. Details of preprocessing of the electronic scoring will be described later with reference to FIG. 9B.

(Scoring Preprocess)

Figure 9B:
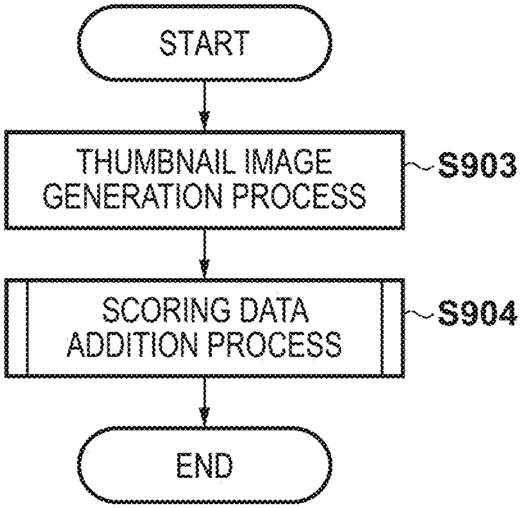

FIG. 9B illustrates a detailed procedure of the electronic scoring preprocessing (step S902) performed by the multifunction peripheral 100 according to the present embodiment. In this flow, preprocessing for electronic scoring using the scan image is executed.

In step S903, the CPU 101 generates a thumbnail image for the image read from the ROM 102, and advances the process to step S904. Here, the generation of a thumbnail image is similar to a JPEG or PNG image generation process performed by a typical multifunction peripheral 100, and is realized by a known method, and the image is stored in the ROM 102. In step S904, the CPU 101 performs a scoring data addition process, and ends the processing of this flowchart. Details of the scoring data addition process will be described later with reference to FIG. 9C.

(Scoring Data Addition Process)

Figure 9C:
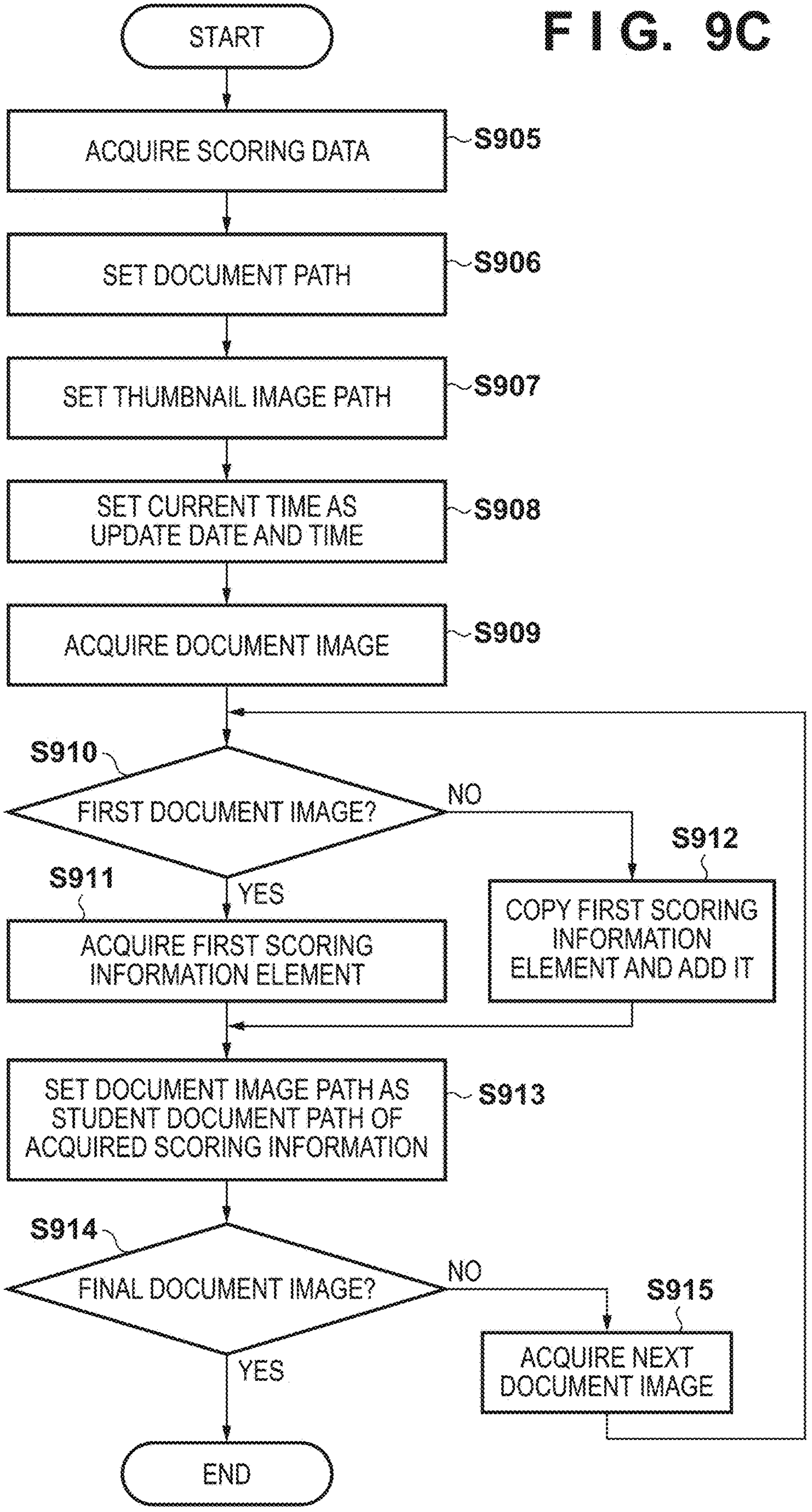

FIG. 9C illustrates a detailed procedure of the scoring data addition process (step S904) performed by the multifunction peripheral 100 according to the present embodiment. In this flow, a process of associating the acquired scan image and thumbnail image with scoring data is performed.

In step S905, the CPU 101 reads the scoring data from the ROM 102 and advances the process to step S906. The scoring data to be read corresponds to the test selected on the screen 309. The target scoring data can be specified by using unique information such as the title of the test or the creation date. Configuration may be such that unique identification information such as a UUID is separately generated at the time of analysis of the answer sheet data, and is assigned to the scoring data, which may be used for identification.

In step S906, the CPU 101 sets the path in the ROM 102 of the scan image stored in the scan process of above-described step S901 as the document path of the scoring data, and advances the process to step S907. In step S907, the CPU 101 sets the path in the ROM 102 of the thumbnail image stored in the thumbnail image generation process of above-described step S903 as a scoring data thumbnail image path, and advances the process to step S908. In step S908, the CPU 101 sets a current date and time as the update date and time for the scoring data, and advances the process to step S909.

In step S909, the CPU 101 reads the scan image from the ROM 102 and advances the process to step S910. In step S910, the CPU 101 determines whether the read scan image is the first scan image. In a case where it is the first scan image, the process proceeds to step S911, and in a case where it is not the first scan image, the process proceeds to step S912. In step S911, the CPU 101 acquires the first element included in the scoring information in the scoring data and advances the process to step S913. Meanwhile, in step S912, the CPU 101 copies the first element included in the scoring information in the scoring data, adds it to the scoring information as a new element, and advances the process to step S913.

In step S913, the CPU 101 sets the path in the ROM 102 of the read scan image as the student document path of the acquired scoring information element, and advances the process to step S914. In step S914, the CPU 101 determines whether the read scan image is the final scan image. In the case of the final scan image, the processing of this flowchart is ended. Meanwhile, in a case where it is not the final scan image, the process proceeds to step S915. In step S915, the CPU 101 reads the next scan image from the ROM 102 and returns the process to step S910.

<Drawing Process (Selection Screen)>

Figure 10:
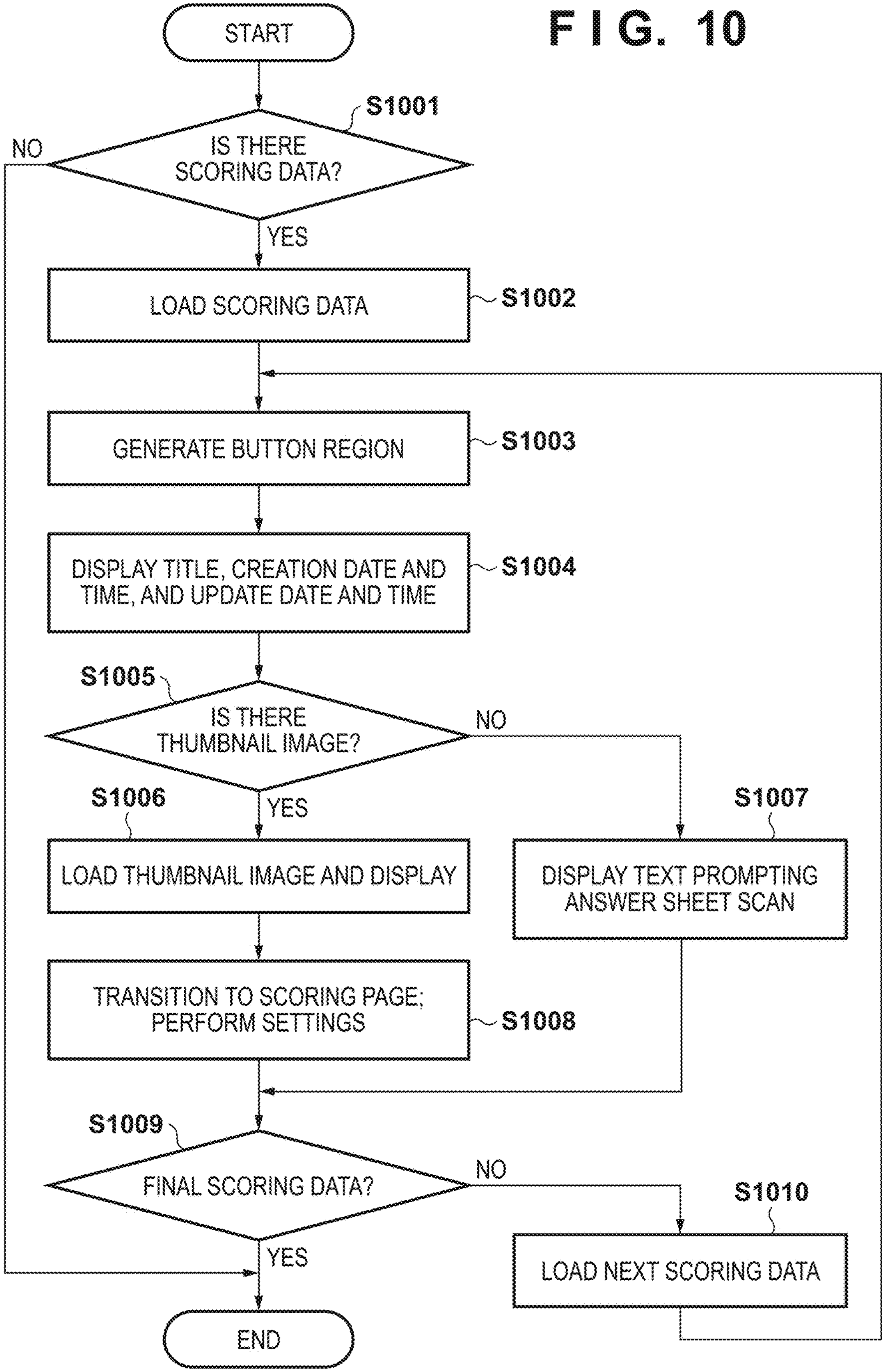
FIG. 10 is a flowchart regarding drawing of a selected page and a control process according to an embodiment.

Next, with reference to FIG. 10, a process for drawing a selected page performed by the multifunction peripheral 100 according to the present embodiment will be described. In this flow, data of an electronic scoring target is displayed to the user. Here, processing performed when the screen 316 is displayed will be described. The process described below is realized by, for example, the CPU 101 reading a program stored in the ROM 102 into the DRAM 103 and executing the program.

In step S1001, the CPU 101 determines whether scoring data is stored in the ROM 102. In a case where the scoring data is stored therein, the process proceeds to step S1002. In a case where scoring data is not stored therein, the processing of this flowchart is ended. In step S1002, the CPU 101 reads the scoring data from the ROM 102 and advances the process to step S1003.

In step S1003, the CPU 101 generates a button region, and advances the process to step S1004. Note that the button region described as an example here is a button tag when expressed specifically in HTML. By setting this tag, operation as a button is configured. For example, in the example of the screen 316, a region of the test A selection button 317 is generated. In step S1004, the CPU 101 acquires and displays a title, a creation date and time, and an update date and time from the scoring data, and advances the process to step S1005. As an example of display processing, display information is set within a button tag when expressed specifically in HTML.

In step S1005, the CPU 101 refers to the thumbnail image data of the ROM 102 according to the thumbnail image path in the scoring data to determine whether a thumbnail image is present. In a case where there is a thumbnail image, the process proceeds to step S1006, and if there is no thumbnail image, the process proceeds to step S1007. In step S1007, the CPU 101 displays text prompting the user to scan the answer sheet, and advances the process to step S1009. As an example of display processing, a p tag is set within a button tag with text set therein when expressed specifically in HTML.

Meanwhile, in step S1006, the CPU 101 acquires the path of the thumbnail image from the scoring data, reads the image from the ROM 102, and displays the image, and then advances the process to step S1008. As an example of display processing, an img tag is set within a button tag and an image is set therein when expressed specifically in HTML. In step S1008, the CPU 101 performs a setting for transitioning to a scoring page, and advances the process to step S1009. When an example of the transition processing is expressed concretely in HTML, a link to the target page is set as an onClick attribute of a button tag.

In step S1009, the CPU 101 determines whether the read scoring data is the final data. In the case where it is the final data, the processing of this flowchart is ended. Meanwhile, in a case where it is not the final data, the process proceeds to step S1010. In step S1010, the CPU 101 reads the next scoring data from the ROM 102 and returns the process to step S1003. By the above-described processing procedure, according to the present embodiment, it is possible to display a list of electronic scoring target tests, and it is possible to perform scoring by transitioning to a scoring screen for a test for which a scoring target document has been scanned.

<Drawing Process (Top Screen)>

Figure 11:
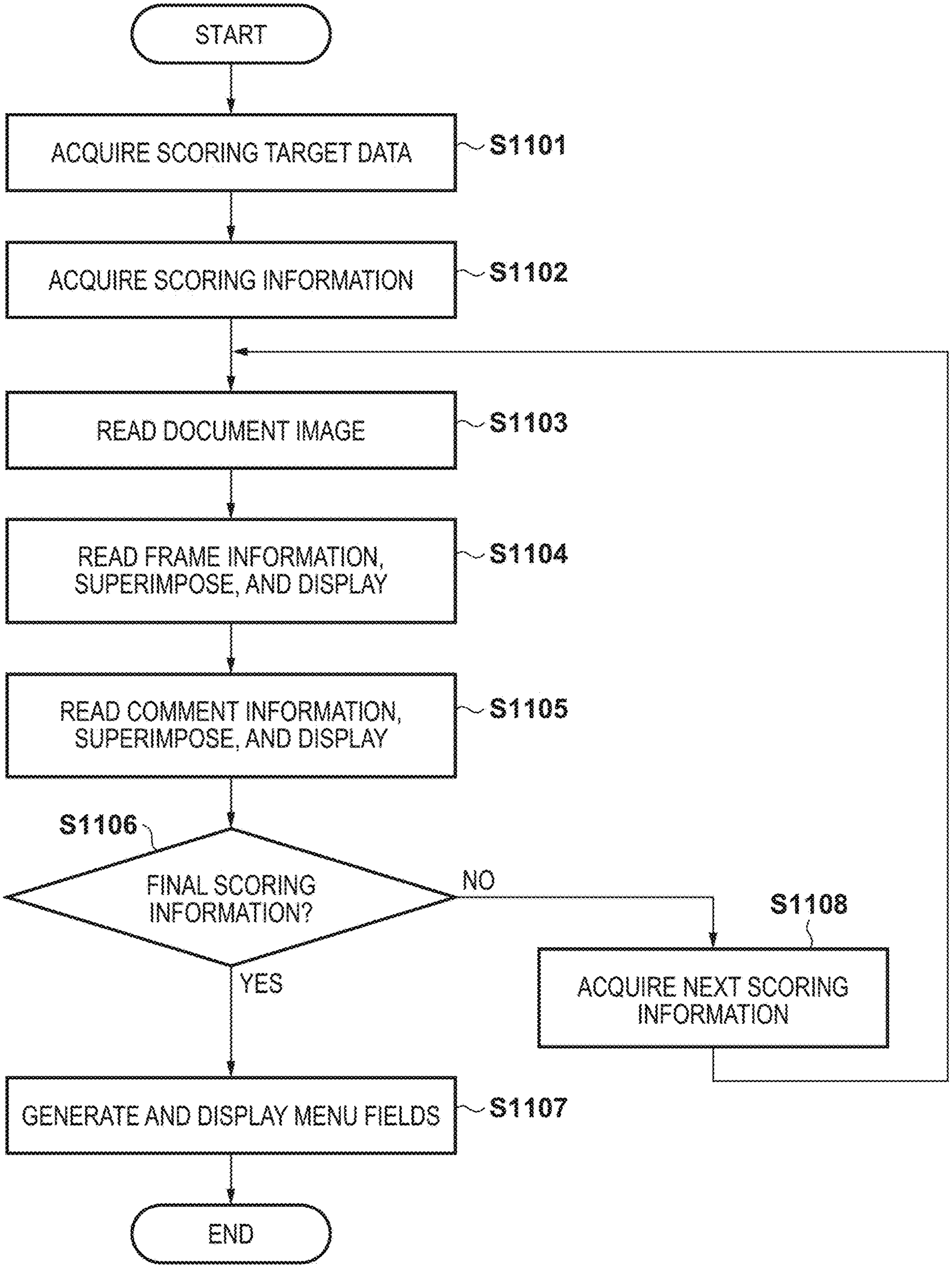
FIG. 11 is a flowchart regarding drawing of a top page and a control process according to an embodiment.

Next, with reference to FIG. 11, a processing procedure for a top page drawing process according to the present embodiment will be described. In this flow, a page for the user to perform electronic scoring on the answer sheet is displayed. Here, processing performed when the screen 400 is displayed will be described. The process described below is realized by, for example, the CPU 101 reading a program stored in the ROM 102 into the DRAM 103 and executing the program.

In step S1101, the CPU 101 reads the scoring data for the test that is to be the target of scoring from the ROM 102 and advances the process to step S1102. In step S1102, the CPU 101 acquires scoring information from the scoring data, and advances the process to step S1103. In step S1103, the CPU 101 reads a document image from the ROM 102 in accordance with the student document path information of the scoring information, and advances the process to step S1104.

In step S1104, the CPU 101 reads frame information from the scoring information and superimposes superimposes the frame information on the document image, displays the result of the superimposing, and advances the process to step S1105. Since there are a plurality of pieces of frame information, processing is performed for all the frame information. In step S1105, the CPU 101 reads the comment information from the scoring information and superimposes the comment information on the document image, displays the result of the superimposing, and advances the process to step S1106. Since there are a plurality of pieces of comment information, processing is performed for all the comment information.

In step S1106, the CPU 101 determines whether or not the referenced scoring information is the final element. In a case where it is the final element, the process proceeds to step S1107, and in a case where it is not the final element, the process proceeds to step S1108.

In step S1107, the CPU 101 draws each type of button for performing electronic scoring, and ends the processing of this flowchart. The various buttons correspond to, for example, the buttons 401 to 403 on the screen 400. Meanwhile, in step S1108, the CPU 101 acquires the next element stored in the scoring information in the scoring data and returns the process to step S1103.

<Drawing Process (Frame Setting Screen)>

(Basic Flow)

Figure 12A:
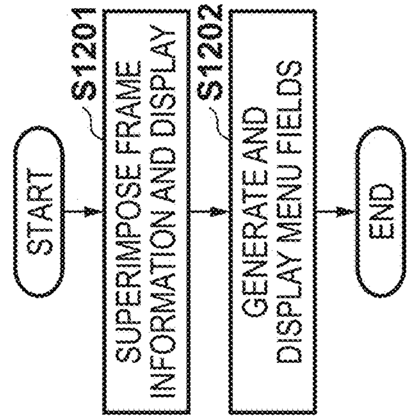
FIGS. 12A to 12F are flowcharts regarding drawing of a frame setting page and a control process according to an embodiment.

Next, with reference to FIGS. 12A to 12F, the processing procedure of the control related to the frame setting screen according to the present embodiment will be described. The process described below is realized by, for example, the CPU 101 reading a program stored in the ROM 102 into the DRAM 103 and executing the program. FIG. 12A illustrates a basic flow when drawing a frame setting screen according to the present embodiment. In this flow, a screen for the user to set a frame for performing electronic scoring on the answer sheet is displayed. Here, processing performed when the screen 405 is displayed will be described.

In step S1201, the CPU 101 superimposes all of the set frame information on the document image and displays the result of the superimposing, and advances the process to step S1202. It is desirable to highlight the superimposed frame so that the user can easily recognize the frame. For example, it is assumed that display is performed as with frames 410 to 412 on the screen 405. In step S1202, the CPU 101 generates and displays a menu field, and ends the processing of this flowchart. Here, the "menu field" refers to, for example, various buttons 406 to 409 on the screen 405.

(Control at Time of Button Operation)

Figure 12B:
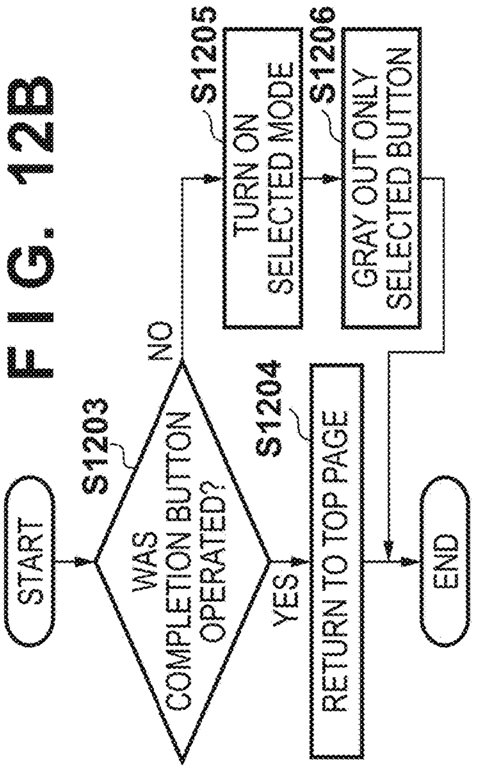

FIG. 12B illustrates a processing procedure when the various buttons 406 to 409 are operated on the frame setting screen according to the present embodiment. In this flow, it is possible to decide a process to be performed by the user on the frame.

In step S1203, the CPU 101 determines whether an operated button is the completion button 409. In a case where it is the completion button 409, the process proceeds to step S1204, in a case where it is not the completion button 409, it is determined that another button (e.g., buttons 406 to 408) has been operated, and the process proceeds to step S1205. In step S1204, the CPU 101 makes a screen transition to the screen 400, and ends the processing of this flowchart. In step S1205, the CPU 101 sets the processing mode corresponding to the selected button to on, and advances the processing to step S1206. In step S1206, the CPU 101 grays out only the selected button, and ends the processing of this flowchart.

(Control of Frame)

Figure 12C:
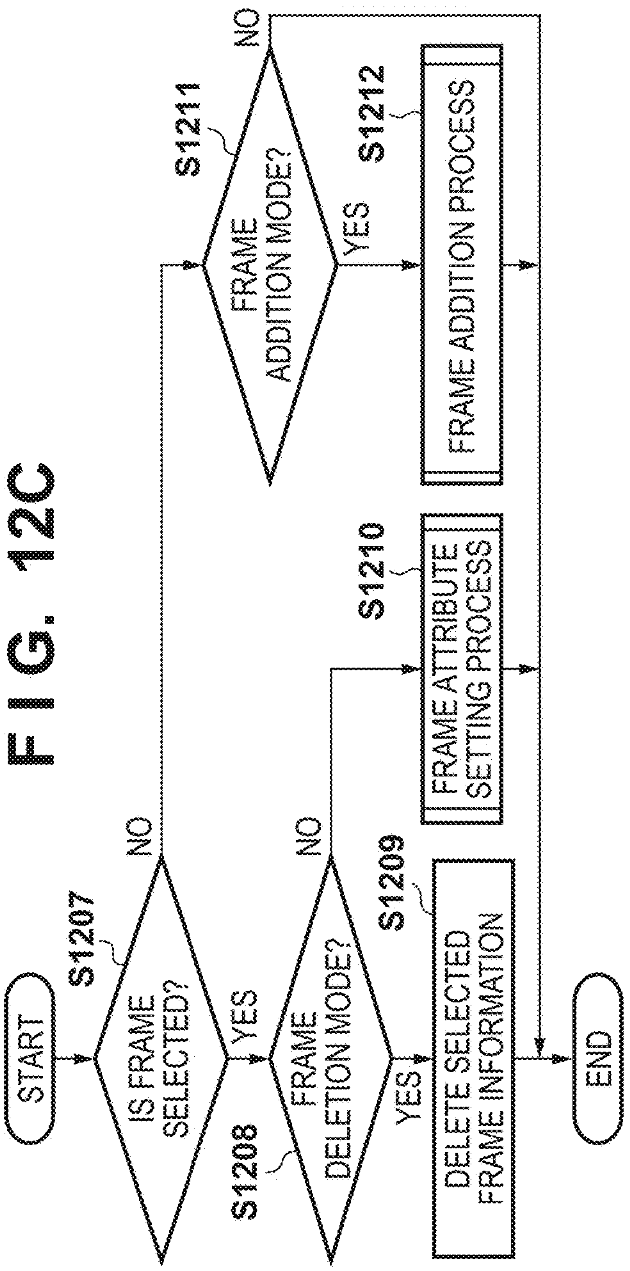

FIG. 12C illustrates a processing procedure when a frame or document image is selected on the frame setting screen according to the present embodiment. In this flow, it is possible to decide a frame process instructed by the user.

In step S1207, the CPU 101 determines whether the selected target is a frame. In a case where it is a frame, the process proceeds to step S1208. In a case where it is not a frame, the process proceeds to step S1211. In a case where the input device is a pointing device, for example, it is determined whether or not a frame is selected by acquiring a pointer position at the time of selection and acquiring a frame corresponding to the position. In step S1208, the CPU 101 determines whether the present processing mode is the frame deletion mode. In a case where it is the frame deletion mode, the process proceeds to step S1209, and if it is not the frame deletion mode, the process proceeds to step S1210.

In step S1209, the CPU 101 deletes the selected frame information, and ends the processing of this flowchart. Meanwhile, in step S1210, the CPU 101 executes a frame attribute setting process on the selected frame information, and ends the processing of this flowchart. Details of the frame attribute setting process will be described later.

In a case where the selected position is not a frame, the CPU 101 determines whether the present processing mode is a frame addition mode in step S1211. In a case where the mode is the frame addition mode, the process proceeds to step S1212, and in a case where the mode is not the frame addition mode, the process of this flowchart is ended. In step S1212, the CPU 101 executes a frame addition process based on the selected position, and ends the processing of this flowchart. Details of the frame addition process will be described later.

(Frame Attribute Setting)

Figure 12D:
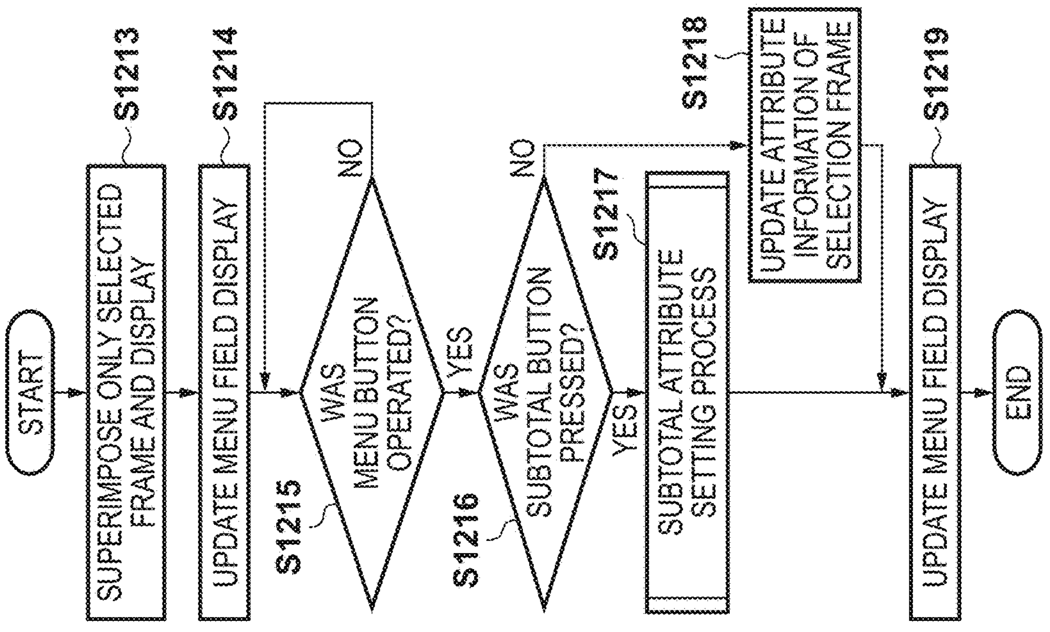

FIG. 12D illustrates a detailed processing procedure for the frame attribute setting process (step S1210) on the frame setting screen according to the present embodiment. In this flow, it is possible to set an attribute for a frame selected by the user.

In step S1213, the CPU 101 superimposes and displays only the selected frame, and advances the process to step S1214. By performing this processing, it becomes easier for the user to recognize a frame to be processed. In step S1214, the CPU 101 updates display of the menu field, and advances the process to step S1215. Here, the "display of the menu field" refers to the various buttons illustrated on the screen 519. Since there are a plurality of frame attributes, it is necessary to display a button corresponding to each attribute, and this processing is necessary.

In step S1215, the CPU 101 determines whether or not a menu button has been operated. In a case where a menu button has been operated, the process proceeds to step S1216. Meanwhile, if an operation has not been performed, the processing of step S1215 is repeated to wait for an operation. Here, the "menu button" refers to the various buttons illustrated on the screen 519. In step S1216, the CPU 101 determines whether or not the subtotal button 523 has been operated. In a case where the subtotal button 523 has been operated, the process proceeds to step S1217, and in a case where the subtotal button 523 has not been operated, the process proceeds to step S1218.

In step S1217, the CPU 101 executes a subtotal attribute setting process, and advances the process to step S1219. Details of the subtotal attribute setting process will be described later. Meanwhile, in step S1218, the CPU 101 updates attribute information of the selection frame, and advances the process to step S1219. The attribute information set here is attribute information corresponding to the operated menu button. In step S1219, the CPU 101 updates display of a menu field, and ends the processing of this flowchart. By performing this process, the screen displayed to the user is returned to the screen illustrated on the screen 516.

(Subtotal Attribute Setting)

Figure 12E:
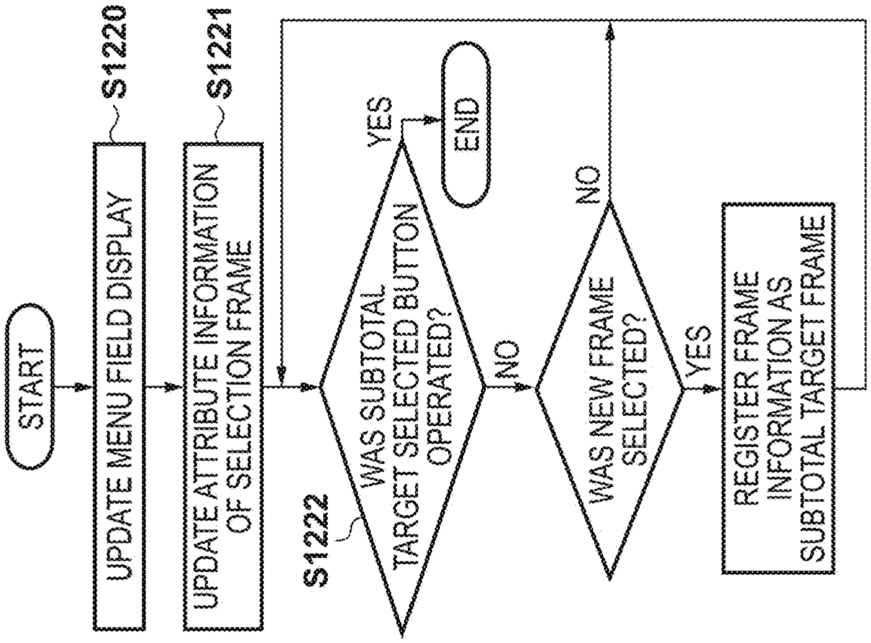

FIG. 12E illustrates a detailed processing procedure for the subtotal attribute setting process (step S1217) on the frame setting screen according to the present embodiment. In this flow, it is possible to set a subtotal frame selected by the user as a frame to be a target of aggregation.

In step S1220, the CPU 101 updates display of the menu field, and advances the process to step S1221. Here, the "display of the menu field" refers to display of the selected button 526 indicated on the screen 524. This processing is necessary because it is necessary to perform finalization processing after selection of a plurality of frames to be subtotalled. In step S1221, the CPU 101 updates attribute information of the selection frame, and advances the process to step S1222. Here, the attribute information to be set is information indicating a subtotal attribute. In the selection method, the pointer may be operated by a pointing device, and the frame may be selected by performing a decision operation using a mouse or the like when the pointer is moved to a region of a predetermined frame.

In step S1222, the CPU 101 determines whether or not the subtotal target selected button 526 has been operated. In a case where it has been operated, the processing of this flowchart is ended, and in a case where it has not been operated, the processing proceeds to step S1223. In step S1223, the CPU 101 determines whether a new frame has been selected. In a case where a new frame is selected, the process proceeds to step S1224, and in a case where a new frame has not been selected, the process returns to step S1222. Here, the "new frame" refers to a frame that is not registered as a subtotal target frame. In step S1224, the CPU 101 registers the selected frame as a subtotal target frame in the frame information, and returns the process to step S1222. Note that the registration destination of the frame information may be stored in the attribute detail information indicated in the scoring information 701, or a new storage destination may be generated separately.

(Frame Addition)

Figure 12F:
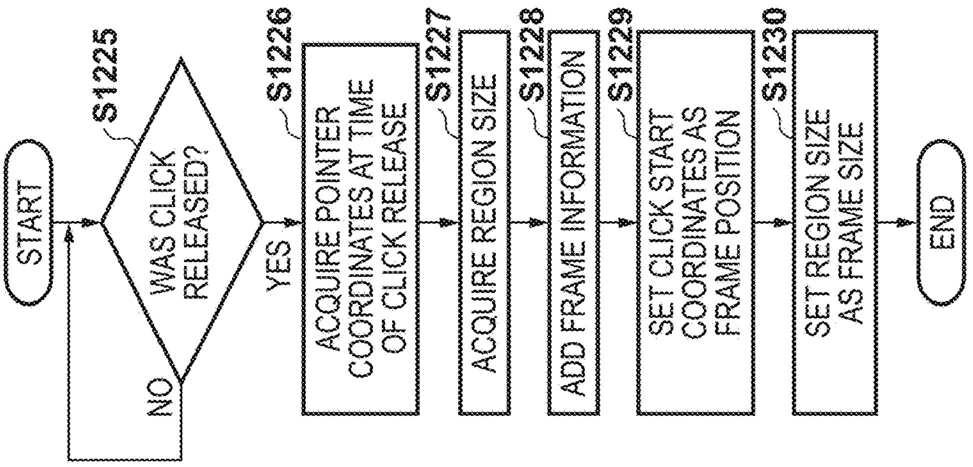

FIG. 12F illustrates a detailed processing procedure for the frame addition process (step S1212) on the frame setting screen according to the present embodiment. In this flow, the user can add a new frame. When adding a frame, for example, a pointer can be operated via a pointing device, a start position (upper left) of the frame can be designated by a click operation or the like, and an end position (lower left) of the frame can be designated by releasing the click operation.

In step S1225, the CPU 101 determines whether or not a click operation has been released. In a case where the click operation or the like has been released, the process proceeds to step S1226, and in a case where the click operation or the like has not been released, the process proceeds to step S1225 to wait for release. Since the user clicks the screen to set the frame start position, and then releases the click to set the frame end position, this processing is necessary in order to wait for the setting of the end position.

In step S1226, the CPU 101 acquires the pointer coordinates at the time of the click operation release or the like, and advances the process to step S1227. In step S1227, the CPU 101 acquires the region size of the frame, and advances the process to step S1228. Note that, as the region size of the frame, a difference between the pointer coordinates at the time of the click operation from the pointer coordinates at the time of the click release may be acquired.

In step S1228, the CPU 101 adds frame information, and advances the process to step S1229. In step S1229, the CPU 101 sets the coordinates at the beginning of the click operation to the added frame information as the frame position, and advances the processing to step S1230. In step S1230, the CPU 101 sets the acquired region size as the frame size in the added frame information, and ends the process of this flowchart.

<Drawing Process (Scoring Screen)>

(Basic Flow)

Next, with reference to FIGS. 13A to 13H, a processing procedure of control related to the scoring screen according to the present embodiment will be described. The process described below is realized by, for example, the CPU 101 reading a program stored in the ROM 102 into the DRAM 103 and executing the program. FIG. 13A illustrates a basic flow of a scoring screen drawing process according to the present embodiment. In this flow, a screen for the user to perform electronic scoring on the answer sheet is displayed. Here, processing performed when the screen 413 is displayed will be described.

In step S1301, the CPU 101 superimposes all of the set frame information and comment information on the document image, displays the result of the superimposing, and advances the process to step S1302. Since there are a plurality of pieces of scoring information, processing is performed for all the scoring information. In step S1302, the CPU 101 generates and displays a menu field, and ends the processing of this flowchart. Here, the "menu field" refers to various buttons 414 to 421 on the screen 413.

(Control at Button Operation)

Figure 13B:
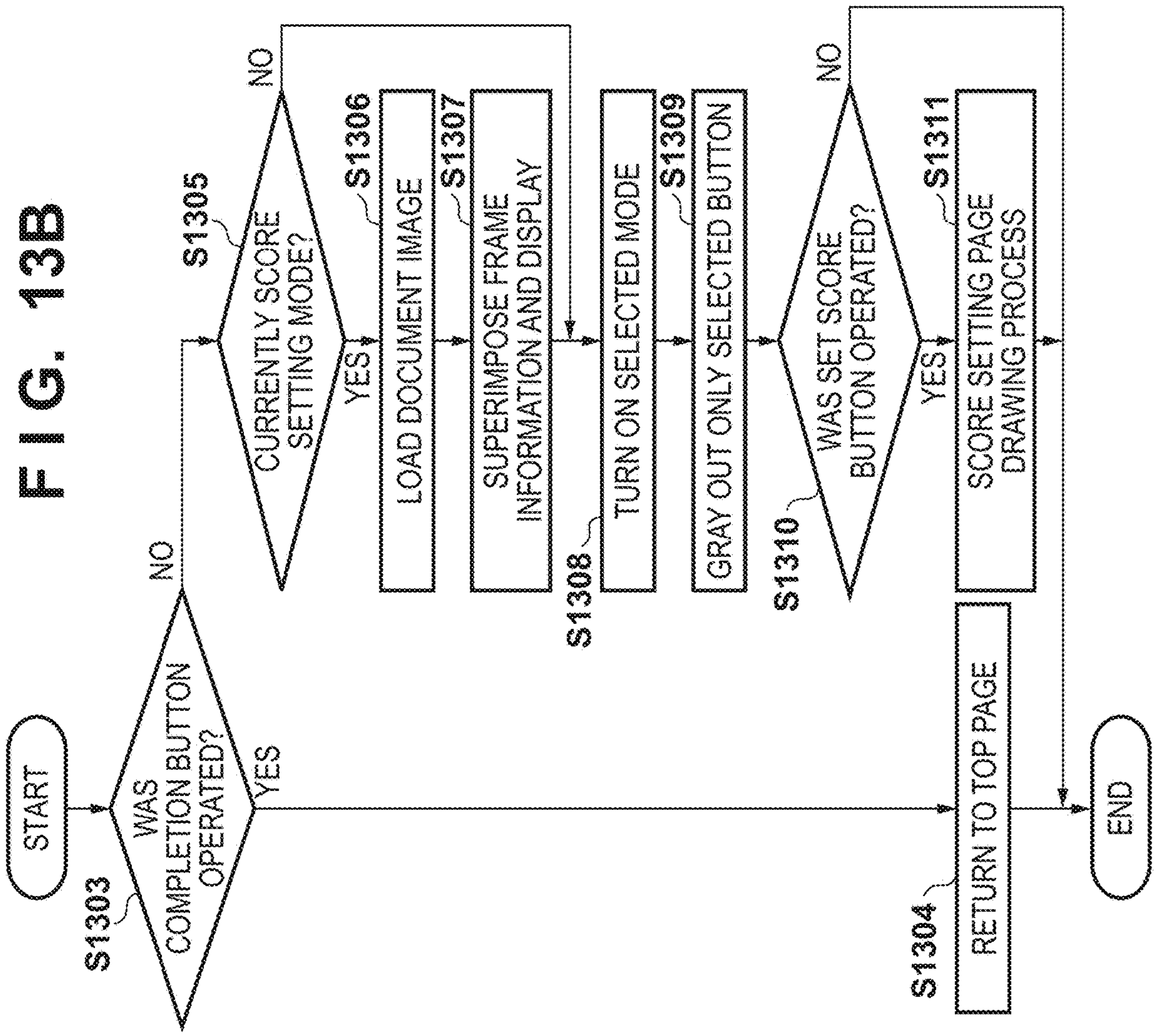
FIGS. 13A-13H are a flowchart regarding drawing of a scoring page and a control process according to an embodiment.
Figure 13A:
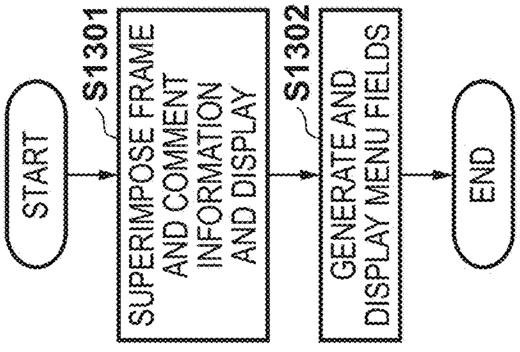

FIG. 13B illustrates a processing procedure when the various buttons 414 to 421 are operated on the scoring screen 413 according to the present embodiment. In this flow, it is possible to decide a process to be performed by the user on a frame and a comment or the document.

In step S1303, the CPU 101 determines whether an operated button is the completion button 421. In a case where the completion button 421 has been operated, the process proceeds to step S1304, and in a case where the completion button 421 has not been operated, the process proceeds to step S1305. In step S1304, the CPU 101 makes a screen transition to the screen 400, and ends the processing of this flowchart.

Meanwhile, in step S1305, the CPU 101 determines whether the present processing mode is the score setting mode. In a case where it is the score setting mode, the process proceeds to step S1306, and in a case where it is not the score setting mode, the process proceeds to step S1308. In a case where the case of the score setting mode, since a screen different from that of the other modes is displayed, this determination is necessary in order to return the screen display to the scoring display. In step S1306, the CPU 101 loads a document image, and advances the process to step S1307. Since a document image is present for each element of the scoring information, all document images are loaded.

In step S1307, the CPU 101 superimposes the frame information on the loaded document image, displays the result of the superimposing, and advances the process to step S1308. Here, all of the frame information of all of the scoring information is superimposed on the corresponding document image and the result is displayed. In step S1308, the CPU 101 sets the processing mode corresponding to the selected button to on, and advances the processing to step S1309. A correct mode is set when the correct button 414 is operated, an incorrect mode is set when the incorrect button 415 is operated, and a partially correct mode is set when the partially correct button 416 is operated. In a case where a comment addition button 417 is operated, the comment addition mode is set, and in a case where the move comment button 418 is operated, the comment movement mode is set. Further, in a case where the delete comment button 419 is operated, a comment deletion mode is set, and in a case where the set score button 420 is operated, the score setting mode is set.

In step S1309, the CPU 101 grays out only the selected button, and advances the processing to step S1310. In step S1310, the CPU 101 determines whether or not the set score button 420 has been operated. In a case where the set score button 420 has been operated, the process proceeds to step S1311, and in a case where the set score button 420 has not been operated, the process of this flowchart is ended. In step S1311, the CPU 101 draws a score setting page, and ends the processing of this flowchart. Here, the score setting page is a page as illustrated on the screen 630, and is a page for drawing the current score allocation information.

(Score Allocation Control)

Figure 13C:
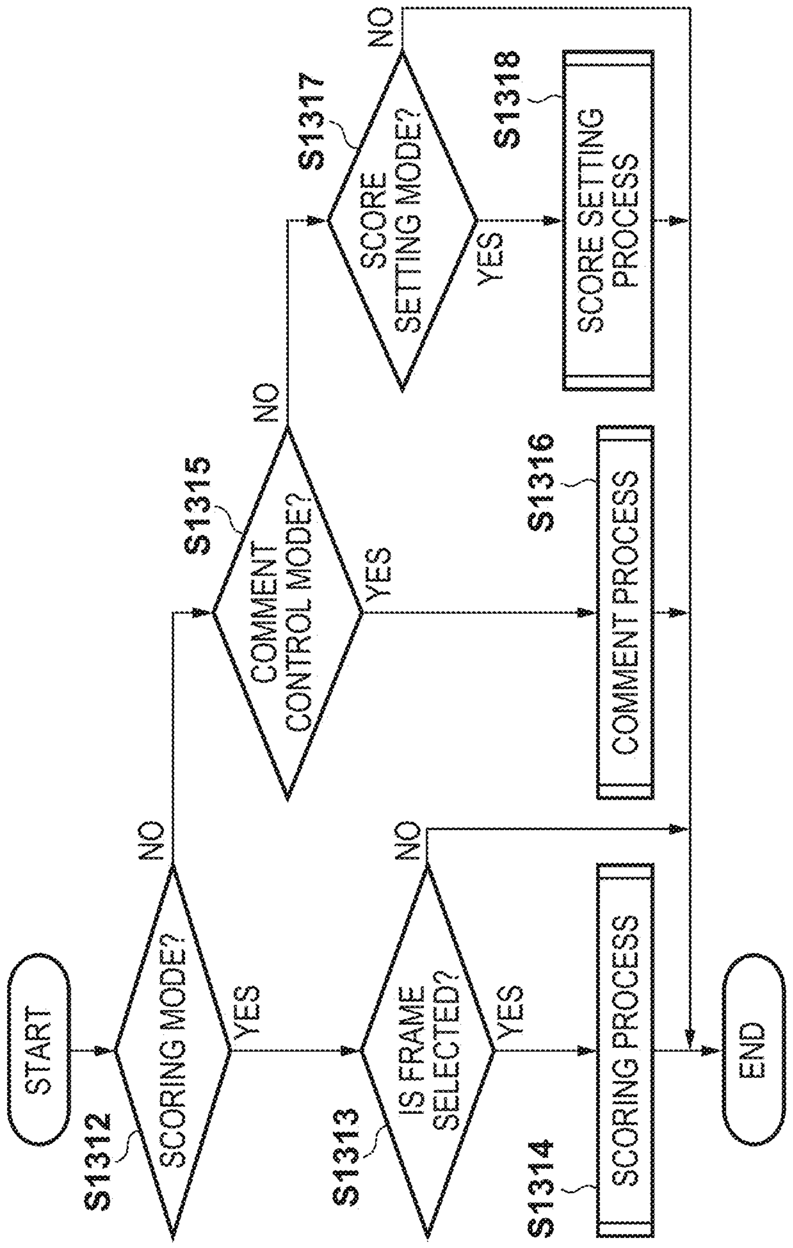

FIG. 13C illustrates a processing procedure when a frame, a document image, or score allocation information is selected on the scoring screen 413 according to the present embodiment. In this flow, it is possible to decide a process to be performed on a selected region.

Meanwhile, in step S1312, the CPU 101 determines whether the present processing mode is a scoring mode. Here, the "scoring mode" is a mode in which any one of the buttons 414, 415, and 416 is selected, and is a mode in which scoring of correct, incorrect, or partially correct is set for a region of the selected frame. In a case where it is the scoring mode, the process proceeds to step S1313, and in a case where it is not this mode, the process proceeds to step S1315. In step S1313, the CPU 101 determines whether a frame has been selected. In a case where a frame has been selected, the process proceeds to step S1314, and in a case where a frame has not been selected, the process of this flowchart is ended. In step S1314, the CPU 101 executes a scoring process, and ends the processing of this flowchart. Details of the scoring process will be described later.

Meanwhile, in step S1315, the CPU 101 determines whether the present processing mode is a comment control mode. Here, the comment control mode is a mode in which any one of the buttons 417, 418, and 419 is selected, and is a mode in which comments are added, moved, or deleted. In a case where it is this mode, the process proceeds to step S1316, and in a case where it is not this mode, the process proceeds to step S1317. In step S1316, the CPU 101 executes a comment process, and ends the processing of this flowchart. Details of the comment process will be described later.

Meanwhile, in step S1317, the CPU 101 determines whether the present processing mode is the score setting mode. In a case where it is this mode, the process proceeds to step S1318, and in a case where it is not this mode, the process of this flowchart is ended. In step S1318, the CPU 101 executes a score setting process, and ends the processing of this flowchart. Details of the score setting process will be described later.

(Scoring Process)

Figure 13D:
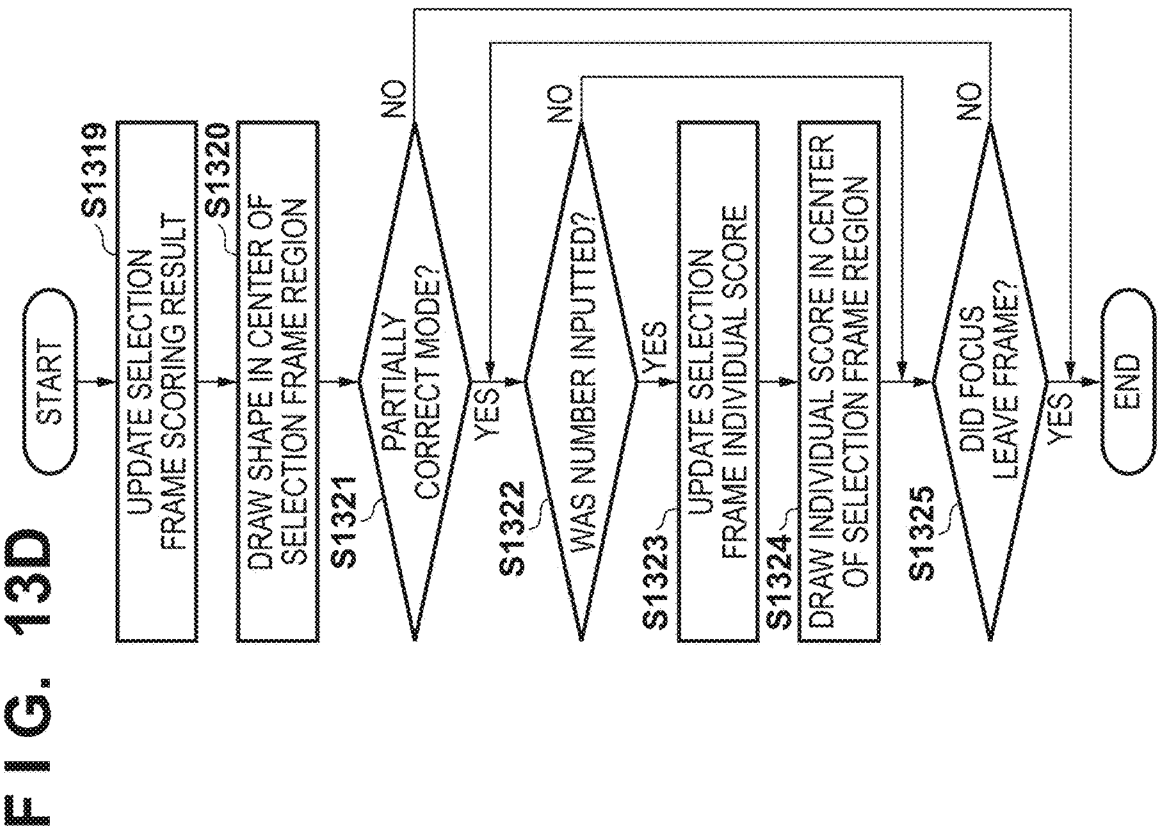

FIG. 13D illustrates a detailed processing procedure for the abovementioned scoring process (step S1314) according to the present embodiment. In this flow, correct, incorrect, or a partially correct can be set for the frame.

In step S1319, the CPU 101 updates the scoring result of the selected frame, and advances the process to step S1320. The scoring result is set with reference to the current processing mode. In step S1320, the CPU 101 draws a shape corresponding to the selected score in the center of the selected frame region, and advances the process to step S1321. The drawing shape is decided in correspondence with the current processing mode.

Meanwhile, in step S1321, the CPU 101 determines whether the present processing mode is the partially correct mode. In a case where it is the partially correct mode, the process proceeds to step S1322, and in a case where it is not the partially correct mode, the process of this flowchart is ended. In step S1322, the CPU 101 determines whether or not there is input of a number from the user. In a case where there is a number input, the process proceeds to step S1323, and in a case where there is no number input, the process repeats the process of step S1325 to wait for the input.

In step S1323, the CPU 101 updates the number that is the input for the individual score of the selected frame information, and advances the process to step S1324. In step S1324, the CPU 101 draws the individual score in the center of the selected frame region, and advances the process to step S1325. In step S1325, the CPU 101 determines whether or not the focus is outside of the selected frame. In a case where the focus is outside of the selected frame, the processing of this flowchart is ended. In a case where the focus is not outside of the selected frame, the process proceeds to step S1322 to once again wait for a key input. Determination as to whether the focus is outside of the selected frame may be made based on whether or not an onBlur event of a textarea tag or the like has fired to give a concrete example using JavaScript.

(Comment Control)

Figure 13E:
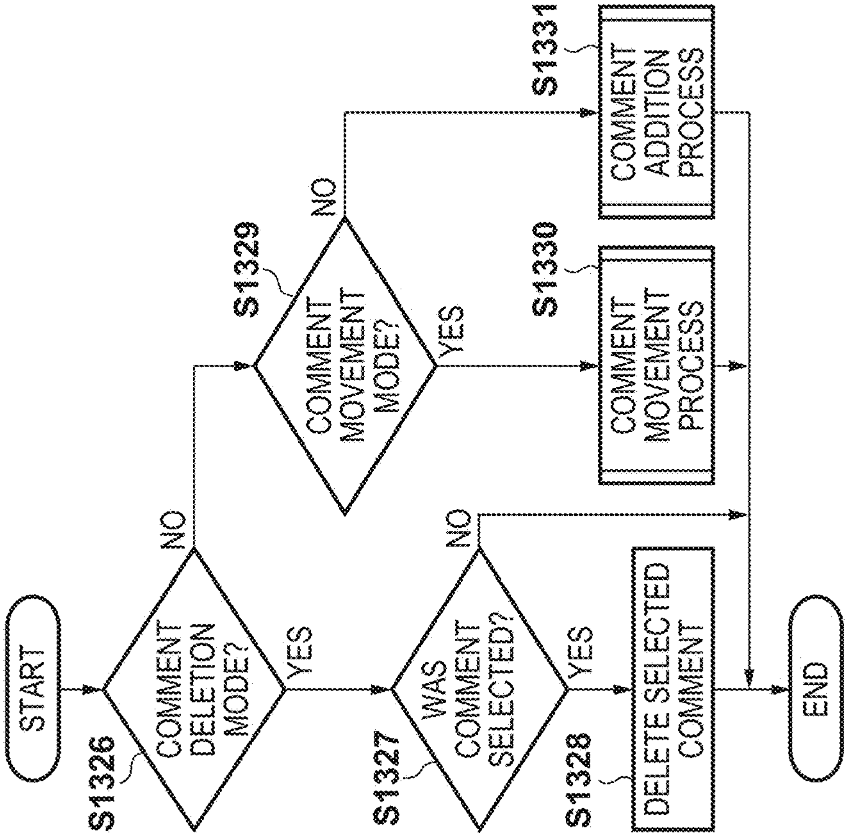

FIG. 13E illustrates a detailed processing procedure for a comment process (step S1316) according to the present embodiment. In this flow, a comment can be added, deleted, or moved.

In step S1326, the CPU 101 determines whether the present processing mode is a comment deletion mode. In a case where it is the comment deletion mode, the process proceeds to step S1327, and in a case where it is not the comment deletion mode, the process proceeds to step S1329. In step S1327, the CPU 101 determines whether a comment has been selected. In a case where a comment has been selected, the process proceeds to step S1328, and in a case where a comment has not been selected, the process of this flowchart is ended. It may be confirmed whether or not there is a comment region including the pointer coordinates to confirm whether or not a comment is selected. In step S1328, the CPU 101 deletes the selected comment information, and ends the processing of this flowchart.

Meanwhile, in step S1329, the CPU 101 determines whether the present processing mode is a comment movement mode. In a case where it is the comment movement mode, the process proceeds to step S1330, and in a case where it is not the comment movement mode, the process proceeds to step S1331. Meanwhile, in step S1330, the CPU 101 executes the comment movement process on the selected comment, and ends the processing of this flowchart. Details of the comment movement process will be described later. Meanwhile, in step S1331, the CPU 101 executes a comment addition process, and ends the processing of this flowchart. Details of the comment addition process will be described later.

(Comment Movement Process)

Figure 13H:
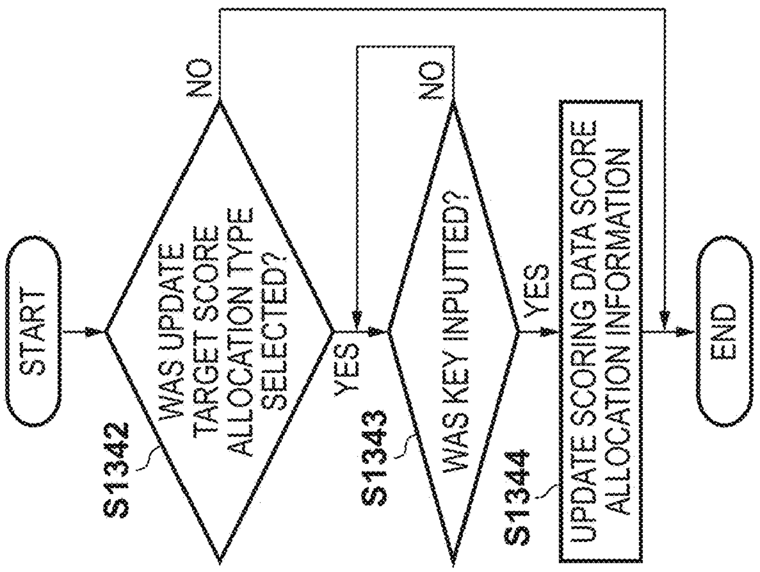
Figure 13G:
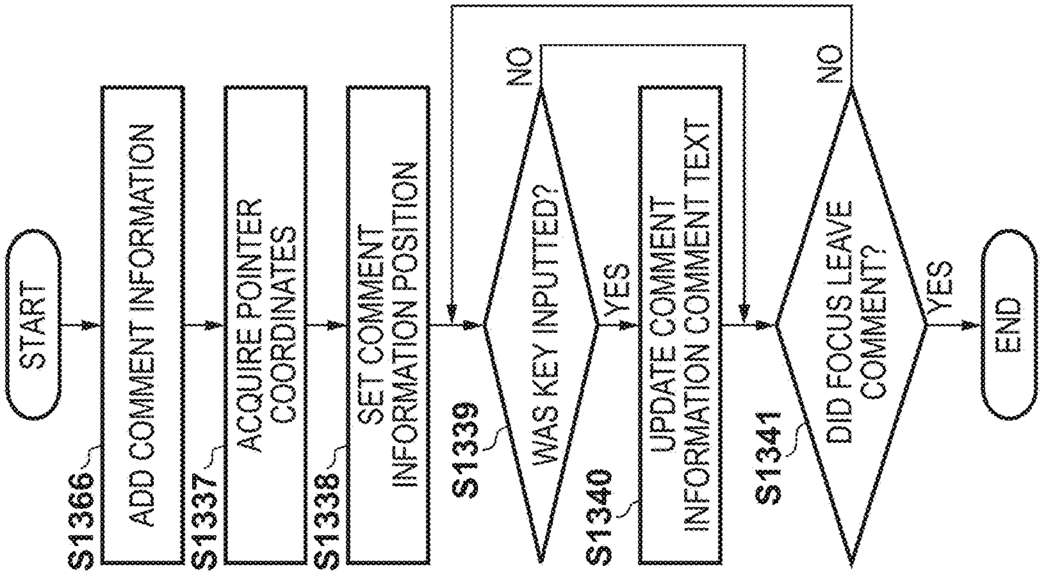
Figure 13F:
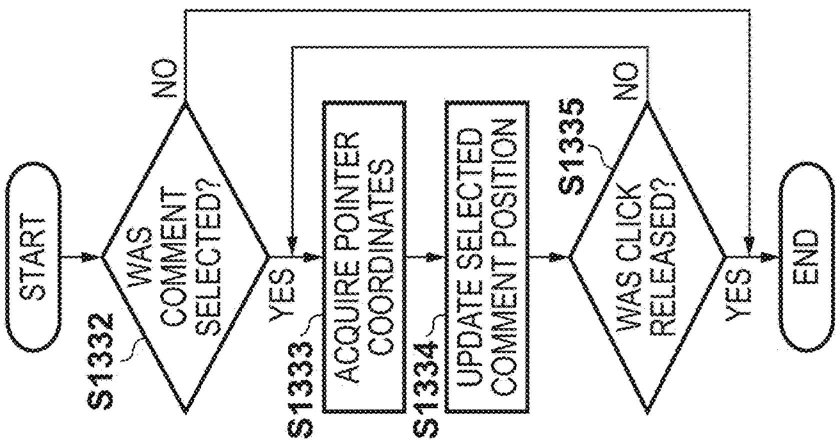

FIG. 13F illustrates a detailed processing procedure for a comment movement process (step S1330) according to the present embodiment. In this flow, a comment can be moved.

In step S1332, the CPU 101 determines whether a comment has been selected. In a case where a comment has been selected, the process proceeds to step S1333, and in a case where a comment has not been selected, the process of this flowchart is ended. In step S1333, the CPU 101 acquires the pointer coordinates and advances the process to step S1334.

In step S1334, the CPU 101 updates the position of the selected comment information, and advances the process to step S1335. Specifically, the position of the comment information is updated by setting pointer coordinates in the position information of the comment information. In step S1335, the CPU 101 determines whether or not a click operation has been released. In a case where it has been released, the processing of this flowchart is ended, and in a case where it has not been released, the processing returns to step S1333.

(Comment Addition Process)

FIG. 13G illustrates a detailed processing procedure for a comment addition process (step S1331) according to the present embodiment. In this flow, a comment can be added.

In step S1336, the CPU 101 adds a new comment element to the comment information in the scoring information, and advances the process to step S1337. In step S1337, the CPU 101 acquires the pointer coordinates and advances the process to step S1338. In step S1338, the CPU 101 updates the newly added comment element position information, and advances the process to step S1339. Note that the process of updating the position information may be performed by setting pointer coordinates.

In step S1339, the CPU 101 determines whether a key has been inputted. In a case where a key has been inputted, the process proceeds to step S1340, and in a case where a key has not been inputted, the process proceeds to step S1341. In step S1340, the CPU 101 updates comment text of the newly added comment element, and advances the process to step S1341. As comment text update processing, in a case where there is a character corresponding to an inputted key, that character is added. Meanwhile, in a case where there is no character corresponding to the inputted key (for example, in the case of a backspace key or an enter key), one-character deletion or space addition is performed, and in the case of an arrow key or the like, nothing is changed.

In step S1341, the CPU 101 determines whether or not the focus is outside of the selected comment. In a case where the focus is outside of the selected comment, the processing of this flowchart is ended. In a case where the focus is not outside of the selected comment, the process returns to step S1339 to once again wait for a key input. Determination as to whether the focus is outside of the selected comment may be made based on whether or not an onBlur event of a textarea tag or the like has fired to give a concrete example using JavaScript.

(Score Setting Processing)

FIG. 13H illustrates a detailed processing procedure for a score setting process (step S1318) according to the present embodiment. In this flow, it is possible to set scores for correct, incorrect, and partially correct (where a score has not been inputted).

In step S1342, the CPU 101 determines whether an update target score allocation type has been selected. In a case where an update target score allocation type has been selected, the process proceeds to step S1343. In a case where an update target score allocation type has not been selected, the processing of this flowchart is ended. For determining whether or not an update target score allocation type has been selected, it may be confirmed whether or not the focus is on a display location such as a text box in which a score is displayed.

In step S1343, the CPU 101 determines whether a key has been inputted. In a case where a key has been inputted, the process proceeds to step S1344, and in a case where a key has not been inputted, the process proceeds to step S1343 to wait for a key input. In step S1344, the CPU 101 updates scoring data score allocation information, and ends the processing of this flowchart. Note that it is desirable to prepare a validation process such as one that invalidates input other than of a number, and thereby control so as to accept only a number.

<Drawing Process (Result Screen)>

(Basic Flow)

Figure 14A:
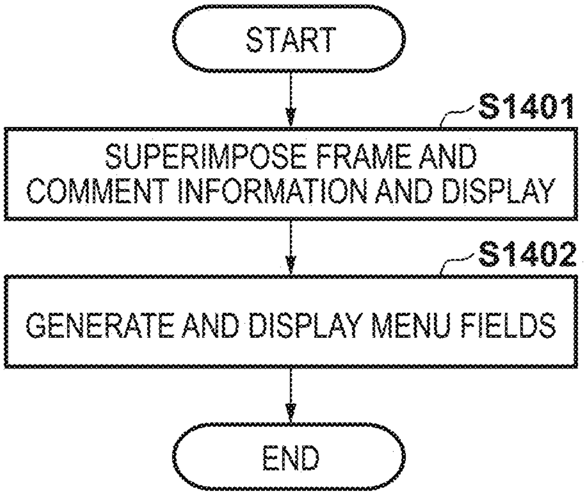
FIGS. 14A-14D are a flowchart regarding drawing of a result page and a control process according to an embodiment.

Next, with reference to FIGS. 14A-14D, a processing procedure of control related to the result screen according to the present embodiment will be described. The process described below is realized by, for example, the CPU 101 reading a program stored in the ROM 102 into the DRAM 103 and executing the program. FIG. 14A illustrates a basic flow of a result screen 422 drawing process according to the present embodiment. In this flow, a page for outputting the result of the electronic scoring is displayed. Here, processing performed when the screen 422 is displayed will be described. The process described below is realized by, for example, the CPU 101 reading a program stored in the ROM 102 into the DRAM 103 and executing the program.

In step S1401, the CPU 101 superimposes all the frame information and comment information on the document image and displays the result of the superimposing, saves to the DRAM 103, and advances the process to step S1402. Since there are a plurality of pieces of scoring information, processing is performed for all the scoring information. In step S1402, the CPU 101 generates and displays a menu field, and ends the processing of this flowchart. Here, "menu field" refers to various buttons 423 to 425 on the screen 422.

(Control at Button Operation)

Figure 14B:
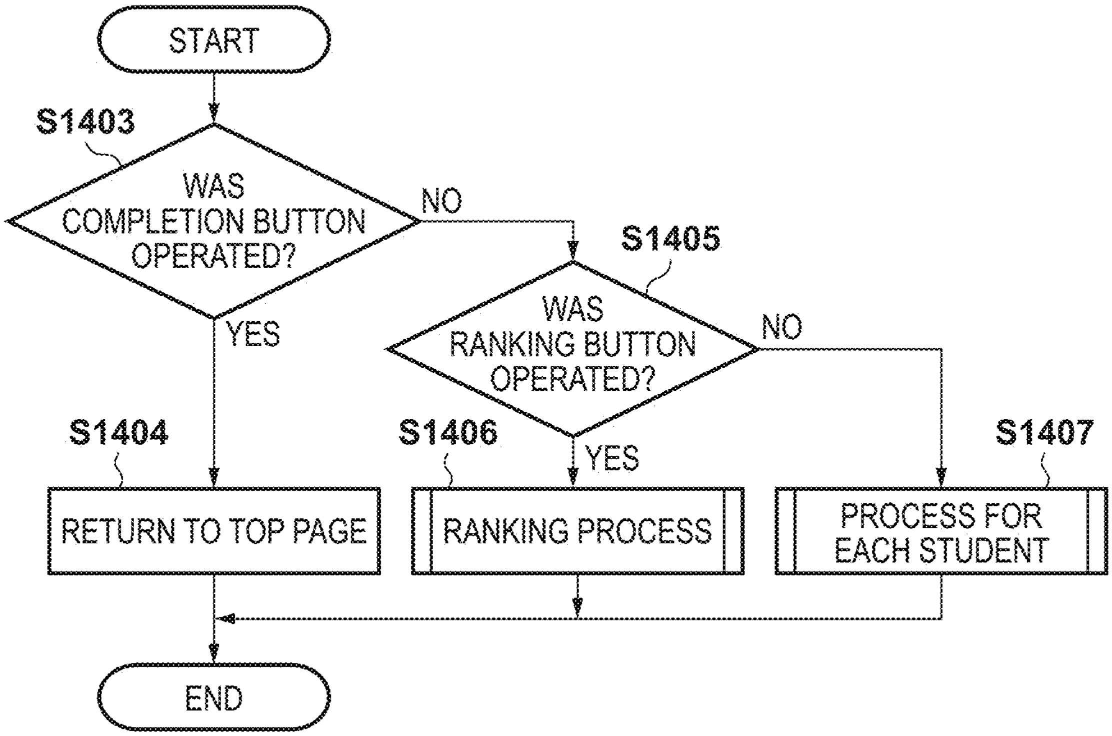

FIG. 14B illustrates a processing procedure for when the various buttons 423 to 425 are operated on the result screen 422 according to the present embodiment. In this flow, a scoring result can be output.

In step S1403, the CPU 101 determines whether an operated button is the completion button 425. In a case where the operated button is the completion button 425, the process proceeds to step S1404, and the operated button is not the completion button 425, the process proceeds to step S1405. In step S1404, the CPU 101 makes a screen transition to the screen 400, and ends the processing of this flowchart.

Meanwhile, in step S1405, the CPU 101 determines whether an operated button is the ranking button 423. In a case where the case of the ranking button 423, the process proceeds to step S1406, and in the case of the ranking button 423, the process proceeds to step S1407. In step S1406, the CPU 101 executes a ranking process, and ends the processing of this flowchart. Details of the ranking process will be described later. Meanwhile, in step S1407, the CPU 101 executes a process for each student, and ends the processing of this flowchart. Details of the process for each student will be described later.

(Ranking Process)

Figure 14C:
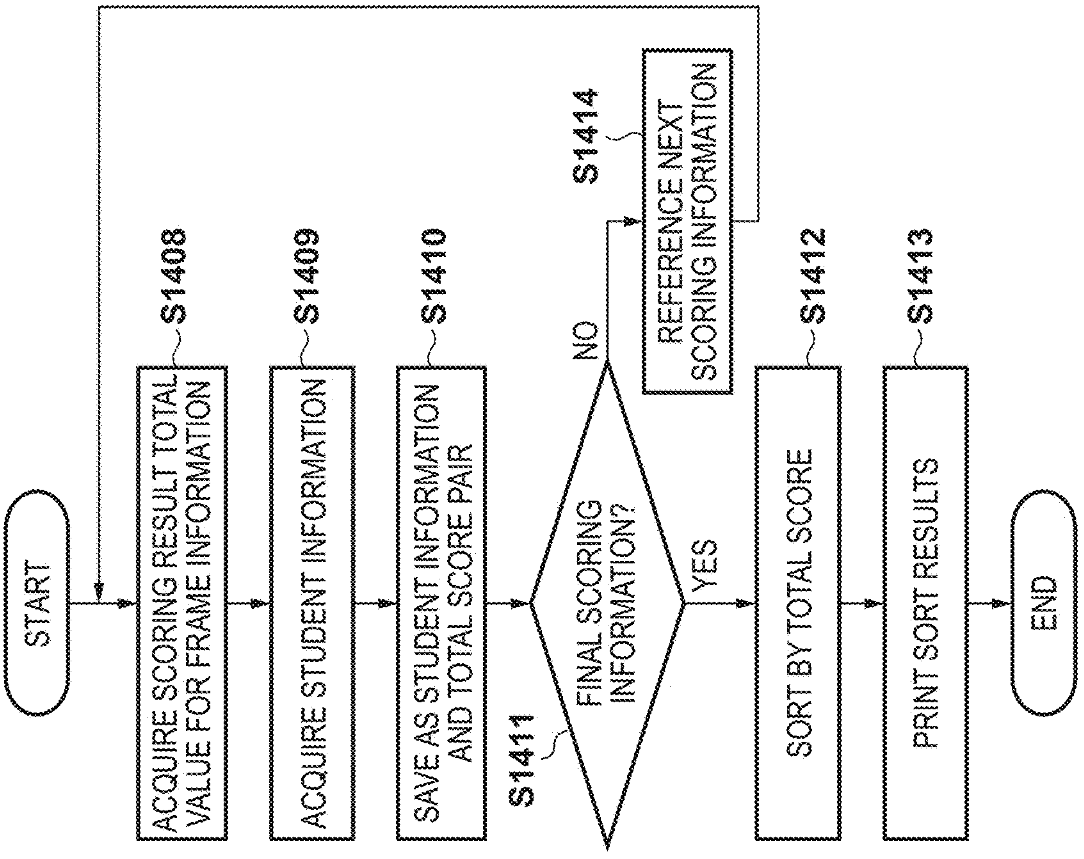

FIG. 14C illustrates a detailed procedure for the ranking process (step S1406) according to the present embodiment. In this flow, it is possible to output student information rearranged in the order of scores.

In step S1408, the CPU 101 acquires a scoring result total value for frame information, and advances the process to step S1409. Incidentally, the scoring result total value can be obtained by acquiring and adding score allocation information corresponding to the scoring results for the frame information for which answer information has been set as attribute information. However, in a case where the scoring result is partially correct, an individual score is referred to, and in a case where the individual score does not include information, the score of the score allocation information is added.

In step S1409, the CPU 101 acquires student information, and advances the process to step S1410. In step S1410, the CPU 101 stores the student information and the total score as a pair in the DRAM 103 and advances the process to step S1411. In step S1411, the CPU 101 determines whether or not the referenced scoring information is the final scoring information element. In a case where it is the final scoring information element, the process proceeds to step S1412, and in a case where it is not the final scoring information element, the process proceeds to step S1414.

In step S1412, the CPU 101 sorts the information of the pairs of student information (personal data) and total score (aggregation data) by total score, and advances the process to step S1413. In step S1413, the CPU 101 generates images based on the information of the pairs of the sorted student information and the total score, outputs the images via the printer 106, and then terminates the process of this flowchart. In the present embodiment, the output is performed by the printer 106, but the output may be performed by the communication unit 107 using various methods such as email transmission, FAX transmission, and file server transmission. Meanwhile, in step S1414, the CPU 101 acquires the next scoring information element and returns the process to step S1408.

(Process for Each Student)

Figure 14D:
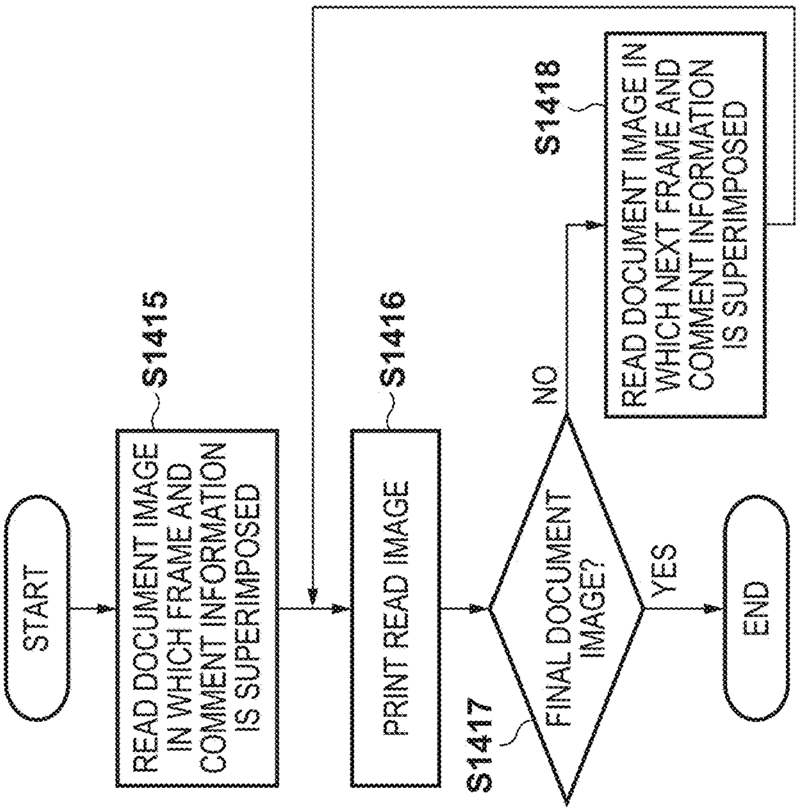

FIG. 14D illustrates a detailed procedure of the process for each student (step S1407) according to the present embodiment. In this flow, it is possible to output a document image in which pre-generated frames and comment information are superimposed and the result is displayed for each student.

In step S1415, the CPU 101 reads from the DRAM 103 a document image in which the frame of the frame information and the comment information are superimposed and displayed, and advances the process to step S1416. The image read out here is an image generated in step S1401, that is, an image in which a scoring result is reflected. In step S1416, the CPU 101 outputs the read document image via the printer 106 and advances the process to step S1417. In the present embodiment, the printer 106 outputs the image, but the present disclosure is not intended to be limited thereto, and the output may be performed by the communication unit 107 by various methods such as email transmission, FAX transmission, and file server transmission.

In step S1417, the CPU 101 determines whether the read document image is the final image. In a case where the read document image is the final image, the processing of this flowchart is ended, and in a case where the read document image is not the final image, the processing proceeds to step S1418. In step S1418, the CPU 101 reads from the DRAM 103 a next document image in which the frame of the frame information and the comment information are superimposed and displayed, and returns the process to step S1416.

As described above, the image processing apparatus according to the present embodiment acquires region information regarding one or more regions on the printed material to be filled in, which is obtained by analyzing the print data of the printed material. In addition, the image processing apparatus superimposes an object indicating a region corresponding to the region information on a read image obtained by reading a printed material on which one or more regions have already been filled in, and displays the result on a display unit. Further, the image processing apparatus sets a confirmation result for each of the one or more regions in accordance with user input that was inputted via the display unit. Thus, in addition to the analysis of the answer sheet print data for electronic scoring preparation, it is possible to perform the electronic scoring using the analysis result and output the result. Therefore, even in the case of an image processing apparatus having insufficient hardware resources, it is possible to provide a mechanism for appropriately confirming the contents of what is filled in to a printed material on which a predetermined item is printed.

Modifications

The present invention is not limited to the above-described embodiment, and various modifications are possible. For example, in the above embodiment, a configuration has been described in which a test which is the answer sheet scan target is selected on the main body operation unit 104. However, the present invention is not limited thereto, and configuration may be taken such that a test which is the answer sheet scan target is selected from an RUI screen displayed when a page of the scoring assistance application is opened by accessing an IP address of the multifunction peripheral 100 from an information terminal such as a PC or a smart phone. Other LUI screens may also be applied as RUI screens.

In the above-described embodiment, the CPU 101 of the multifunction peripheral 100 is used to analyze the print data to acquire the rectangle information; however, if the software that generates the answer sheet and the multifunction peripheral 100 can cooperate with each other, the rectangle analysis process may be executed in the answer sheet generation software. For example, the print data may be analyzed by a printer, an information device, or the like that outputs a printed material in accordance with print data different from that of the multifunction peripheral 100. In this case, the apparatus may be of a configuration that transmits the analysis result to the multifunction peripheral 100 to thereby skip the rectangle analysis process in the multifunction peripheral 100.

Further, in the above-described embodiment, a PDL analysis flag is set to on in advance to prepare for electronic scoring, and then a print job is inputted to the multifunction peripheral 100 for analysis. However, in a case where the software for generating the answer sheet and the multifunction peripheral 100 can cooperate with each other, an analysis flag may be provided as attribute information of the print job, and the flag may be set to on by the answer sheet generation software in a case where printing is performed for this purpose. Configuration may be taken such that in this case, the multifunction peripheral 100 analyzes only jobs for which the flag is on. This reduces the time and effort that the user has to spend setting PDL analysis flag to on and thereby makes it possible to improve convenience.

In addition, in the above-described embodiment, a test to be scanned for the answer sheet is selected from a screen in the scoring assistance application displayed on the main body operation unit 104. However, an icon for performing the electronic scoring scan process together with the rectangle analysis process at the time of analyzing the print data may be generated on the home screen. In this case, since the user can immediately scan the answer sheet by operating the icon without selecting the test target on a screen of the scoring assistance application, convenience can be improved.

In addition, in the above-described embodiment, the print data analysis process executed by the multifunction peripheral 100 and the electronic scoring process in general may be performed by the user's PC or a server. Alternatively, the printer that prints the test answer sheet may be a different printer from the printer that scans the filled in answer sheet and performs electronic scoring. In this case, the print data may be analyzed by a printer that prints the sheet, and the analysis result may be provided to the printer that scans the answer sheet, or the printer that scans the sheet may acquire the print data from the printer that prints the sheet and then analyze the data.

Further, in the above embodiment, an answer sheet of a test has been described as an example of a printed material on which a predetermined item is printed. However, the present invention is not limited to this, and can be applied to an arbitrary entry sheet such as a business form or an application form. In this case, the print data may be analyzed to analyze input fields and the like, and a frame or the like indicating an analysis result may be superimposed on the read image obtained by reading the filled in sheet and a result of the superimposing may be displayed, and a user confirmation result or an object indicating or the appropriateness of the filled in content may be superimposed and a result of the superimposing may be displayed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-090206, filed May 31, 2023 which is hereby incorporated by reference herein in its entirety.

What is claimed is:

1. An image processing apparatus comprising:

one or more memory devices that store a set of instructions; and one or more processors that execute the set of instructions to:

(1) acquire answer region information on one or more answer regions on an answer sheet in which an answer is to be filled, the answer region information being obtained by analyzing a drawing command included in print data of the answer sheet;

(2) output the answer sheet in accordance with the print data;

(3) read the output answer sheet in which the answer has been filled;

(4) superimpose, based on the answer region information, an object indicating an answer region corresponding to the answer region information on a read image obtained by the reading of the output answer sheet in which the answer has been filled;

(5) cause an information processing apparatus to display a result of the superimposing, the object being selected by a user with the information processing apparatus for scoring the answer;

(6) cause the information processing apparatus to display a scoring screen for scoring the answer sheet;

(7) select the answer by user selection of the superimposed object on the displayed scoring screen; and (8) set a scoring result indicating correct, incorrect, or partially correct for the selected answer.

2. The image processing apparatus according to claim 1, wherein a scoring result of the answer is superimposedly displayed on the answer region.

3. The image processing apparatus according to claim 1, wherein the one or more processors execute the set of instructions to, in accordance with a user input that is inputted via the information processing apparatus, set an attribute indicating content of the answer region for each of the one or more answer regions.

4. The image processing apparatus according to claim 1, wherein the one or more processors execute the set of instructions to, in accordance with a user input that is inputted via the information processing apparatus, (1) select the object indicating the answer region that is superimposed on the read image, and (2) delete an answer region corresponding to the selected object.

5. The image processing apparatus according to claim 1, wherein the one or more processors execute the set of instructions to, in accordance with a user input that is inputted via information processing apparatus, set an object indicating a new answer region in the read image.

6. The image processing apparatus according to claim 1, wherein the one or more processors execute the set of instructions to:

(1) in the outputting of the answer sheet, print the answer sheet in accordance with the print data;

(2) analyze the drawing command included in the print data, generate the answer region information, and store the answer region information in a memory; and (3) acquire the answer region information stored in the memory.

7. The image processing apparatus according to claim 1, wherein the print data is received via a network.

8. The image processing apparatus according to claim 1, wherein the one or more processors execute the set of instructions to, in accordance with a user input that is inputted via the scoring screen, set a score for partially correct for the answer.

9. The image processing apparatus according to claim 1, wherein the one or more processors execute the set of instructions to set a comment at a selected position in the read image in accordance with a user input that is inputted via the information processing apparatus.

10. The image processing apparatus according to claim 9, wherein the one or more processors execute the set of instructions to superimpose the set comment on the read image and display the superimposed result.

11. The image processing apparatus according to claim 10, wherein the one or more processors execute the set of instructions to output the read image after reflecting a scoring result for the answer sheet.

12. The image processing apparatus according to claim 11, wherein the one or more processors execute the set of instructions to output at least one of personal data and aggregation data based on a scoring result of a plurality of scoring targets of the answer sheet.

13. The image processing apparatus according to claim 1, wherein the one or more processors execute the set of instructions to control display to the information processing apparatus by transmitting screen information to the information processing apparatus.

14. The image processing apparatus according to claim 1, wherein the analysis of the drawing command comprises determining whether the drawing command is a rectstroke drawing command.

15. A method for controlling an image processing apparatus, the method comprising:

acquiring answer region information on one or more answer regions on an answer sheet in which an answer is to be filled, the answer region information being obtained by analyzing a drawing command included in print data of the answer sheet;

outputting the answer sheet in accordance with the print data;

reading the output answer sheet in which the answer has been filled;

superimposing, based on the answer region information, an object indicating an answer region corresponding to the answer region information on a read image obtained by the reading of the answer sheet in which the answer has been filled;

causing an information processing apparatus to display a result of the superimposing, the object being selected by a user with the information processing apparatus for scoring the answer;

causing the information processing apparatus to display a scoring screen for scoring the answer sheet;

selecting the answer by user selection of the superimposed object on the displayed scoring screen; and setting a scoring result indicating correct, incorrect, or partially correct for the selected answer.

16. A non-transitory computer-readable storage medium storing a program for causing an image processing apparatus to:

acquire answer region information on one or more answer regions on an answer sheet in which an answer is to be filled, the answer region information being obtained by analyzing a drawing command included in print data of the answer sheet;

output the answer sheet in accordance with the print data;

read the output answer sheet in which the answer has been filled;

superimpose, based on the answer region information, an object indicating an answer region corresponding to the answer region information on a read image obtained by the reading of the answer sheet in which the answer has been filled;

display a result of the superimposing, the object being selected by a user with the information processing apparatus for scoring the answer;

cause the information processing apparatus to display a scoring screen for scoring the answer sheet;

select the answer by user selection of the superimposed object on the displayed scoring screen; and set a scoring result indicating correct, incorrect, or partially correct for the selected answer.

* * * * *